(12) United States Patent
Iazikov et al.

(10) Patent No.: US 7,359,597 B1
(45) Date of Patent: Apr. 15, 2008

(54) BIREFRINGENCE CONTROL IN PLANAR OPTICAL WAVEGUIDES

(75) Inventors: Dmitri Iazikov, Springfield, OR (US); Christoph M. Greiner, Eugene, OR (US); Thomas W. Mossberg, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 0 days.

(21) Appl. No.: 11/210,439

(22) Filed: Aug. 23, 2005

Related U.S. Application Data

(60) Provisional application No. 60/604,111, filed on Aug. 23, 2004.

(51) Int. Cl.
*G02B 6/34* (2006.01)
(52) U.S. Cl. ............... 385/37; 385/11; 385/14; 385/123; 385/129; 385/131; 359/34
(58) Field of Classification Search ............ 385/37, 385/123, 11, 14, 129–131, 145, 147; 359/34
See application file for complete search history.

(56) References Cited

U.S. PATENT DOCUMENTS

| | | | |
|---|---|---|---|
| 3,995,937 | A | 12/1976 | Baues et al. |
| 4,006,967 | A | 2/1977 | Kenan et al. |
| 4,140,362 | A | 2/1979 | Tien |
| 4,387,955 | A | 6/1983 | Ludman et al. |
| 4,440,468 | A | 4/1984 | Auracher et al. |
| 4,660,934 | A | 4/1987 | Akiba et al. |
| 4,740,951 | A | 4/1988 | Lizet et al. |
| 4,743,083 | A | 5/1988 | Schimpe |
| 4,746,186 | A | 5/1988 | Nicia |
| 4,773,063 | A | 9/1988 | Hunsperger et al. |

(Continued)

FOREIGN PATENT DOCUMENTS

| | | |
|---|---|---|
| EP | 0 310 438 A1 | 4/1989 |
| GB | 2 168 215 A | 6/1986 |
| WO | WO - 99/35523 A1 | 7/1999 |
| WO | WO - 99/56159 A1 | 11/1999 |
| WO | WO 02-075411 | 9/2002 |

OTHER PUBLICATIONS

Capron et al, J. Lightwave Tech., vol. 11 No. 12 pp. 2009-2014 (Dec. 1993).

(Continued)

*Primary Examiner*—Brian M. Healy
*Assistant Examiner*—Guy G Anderson
(74) *Attorney, Agent, or Firm*—David S. Alavi

(57) ABSTRACT

A planar optical waveguide has a set of diffractive elements and confines propagating optical signals in at least one transverse spatial dimension. Each diffractive element set routes, between input and output ports, a corresponding diffracted portion of an input optical signal propagating in the planar optical waveguide that is diffracted by the diffractive element set. The input optical signal is successively incident on the diffractive elements. A desired level of birefringence for a chosen signal optical transverse mode is determined at least in part by i) selected areal density of diffractive elements, ii) selected diffractive element height and position along the confined transverse spatial dimension, iii) selected thicknesses and indices of materials comprising the diffractive elements, or iv) selected thicknesses and stress-optical coefficients of materials comprising the planar optical waveguide, and selected thermal expansion coefficient differentials among materials comprising the planar optical waveguide or comprising a waveguide substrate thereof.

30 Claims, 32 Drawing Sheets

U.S. PATENT DOCUMENTS

| | | | |
|---|---|---|---|
| 4,786,133 | A | 11/1988 | Gidon et al. |
| 4,803,696 | A | 2/1989 | Pepper et al. |
| 4,824,193 | A | 4/1989 | Maeda et al. |
| 4,834,474 | A | 5/1989 | George et al. |
| 4,846,552 | A | 7/1989 | Veldkamp et al. |
| 4,852,960 | A | 8/1989 | Alferness et al. |
| 4,923,271 | A | 5/1990 | Henry et al. |
| 4,938,553 | A | 7/1990 | Maerz et al. |
| 5,040,864 | A | 8/1991 | Hong |
| 5,093,874 | A | 3/1992 | Hawkins et al. |
| 5,107,359 | A | 4/1992 | Ohuchida |
| 5,165,104 | A | 11/1992 | Weverka |
| 5,195,161 | A | 3/1993 | Adar et al. |
| 5,357,591 | A | 10/1994 | Jiang et al. |
| 5,450,511 | A | 9/1995 | Dragone |
| 5,453,871 | A | 9/1995 | Kolner et al. |
| 5,668,900 | A | 9/1997 | Little et al. |
| 5,768,450 | A | 6/1998 | Bhagavatula |
| 5,812,318 | A | 9/1998 | Babbitt et al. |
| 5,830,622 | A | 11/1998 | Canning et al. |
| 5,907,647 | A | 5/1999 | Eggleton et al. |
| 5,930,439 | A * | 7/1999 | Ojha et al. ............ 385/129 |
| 5,995,691 | A | 11/1999 | Arai et al. |
| 6,011,884 | A | 1/2000 | Dueck et al. |
| 6,011,885 | A | 1/2000 | Dempewolf et al. |
| 6,137,933 | A | 10/2000 | Hunter et al. |
| 6,144,480 | A | 11/2000 | Li et al. |
| 6,169,613 | B1 | 1/2001 | Amitai et al. |
| 6,169,614 | B1 | 1/2001 | Whitcomb et al. |
| 6,266,463 | B1 | 7/2001 | Laming et al. |
| 6,285,813 | B1 | 9/2001 | Schultz et al. |
| 6,323,970 | B1 | 11/2001 | Popovich |
| 6,408,118 | B1 | 6/2002 | Ahuja et al. |
| 6,473,232 | B2 | 10/2002 | Ogawa |
| 6,553,162 | B1 | 4/2003 | Okayama |
| 6,603,901 | B1 | 8/2003 | Hale et al. |
| 6,678,429 | B2 | 1/2004 | Mossberg et al. |
| 6,702,897 | B2 | 3/2004 | Cullen et al. |
| 6,718,093 | B2 | 4/2004 | Zhou |
| 6,768,834 | B1 | 7/2004 | Gruhlke |
| 6,823,115 | B2 | 11/2004 | Greiner et al. |
| 6,829,417 | B2 | 12/2004 | Greiner et al. |
| 6,850,670 | B2 * | 2/2005 | Parhami et al. ............ 385/37 |
| 6,859,318 | B1 | 2/2005 | Mossberg |
| 6,876,791 | B2 | 4/2005 | Murashima et al. |
| 6,879,441 | B1 | 4/2005 | Mossberg |
| 6,928,223 | B2 | 8/2005 | Walpole et al. |
| 6,961,491 | B2 | 11/2005 | Greiner et al. |
| 6,965,464 | B2 | 11/2005 | Mossberg |
| 6,965,716 | B2 | 11/2005 | Greiner et al. |
| 6,985,656 | B2 | 1/2006 | Iazikov et al. |
| 6,987,911 | B2 | 1/2006 | Mossberg et al. |
| 6,990,276 | B2 | 1/2006 | Brice et al. |
| 6,993,223 | B2 | 1/2006 | Greiner et al. |
| 7,003,187 | B2 | 2/2006 | Frick et al. |
| 7,009,743 | B2 | 3/2006 | Mossberg |
| 7,016,569 | B2 | 3/2006 | Mule et al. |
| 7,049,704 | B2 | 5/2006 | Chakravorty et al. |
| 7,054,517 | B2 | 5/2006 | Mossberg et al. |
| 7,062,128 | B2 | 6/2006 | Mossberg |
| 7,116,453 | B2 | 10/2006 | Mossberg |
| 7,116,852 | B2 | 10/2006 | Tuda |
| 7,120,334 | B1 | 10/2006 | Greiner et al. |
| 7,123,794 | B2 | 10/2006 | Greiner et al. |
| 7,181,103 | B1 | 2/2007 | Greiner et al. |
| 7,190,856 | B1 | 3/2007 | Iazikov et al. |
| 7,190,858 | B1 | 3/2007 | Greiner et al. |
| 7,190,859 | B2 | 3/2007 | Greiner et al. |
| 7,194,164 | B2 | 3/2007 | Iazikov et al. |
| 7,203,401 | B2 | 4/2007 | Mossberg et al. |
| 2002/0071646 | A1 | 6/2002 | Eggleton et al. |
| 2002/0122650 | A1 * | 9/2002 | Kominato et al. .......... 385/131 |
| 2003/0011833 | A1 * | 1/2003 | Yankov et al. ................ 359/34 |
| 2003/0039444 | A1 * | 2/2003 | Mossberg et al. ............. 385/37 |
| 2003/0068113 | A1 * | 4/2003 | Janz et al. .................... 385/11 |
| 2003/0117677 | A1 | 6/2003 | Mossberg |
| 2004/0076374 | A1 | 4/2004 | Greiner et al. |
| 2004/0131360 | A1 | 7/2004 | Iazikov et al. |
| 2004/0170356 | A1 | 9/2004 | Iazikov et al. |
| 2004/0179779 | A1 | 9/2004 | Greiner et al. |
| 2004/0208466 | A1 | 10/2004 | Mossberg et al. |
| 2004/0258356 | A1 | 12/2004 | Brice et al. |
| 2005/0018951 | A1 | 1/2005 | Mossberg et al. |
| 2005/0063430 | A1 | 3/2005 | Doucet et al. |
| 2005/0078912 | A1 | 4/2005 | Iazikov et al. |
| 2005/0135744 | A1 | 6/2005 | Greiner et al. |
| 2005/0135745 | A1 | 6/2005 | Greiner et al. |
| 2005/0135747 | A1 | 6/2005 | Greiner et al. |
| 2005/0152011 | A1 | 7/2005 | Mossberg |
| 2005/0163425 | A1 | 7/2005 | Greiner et al. |
| 2005/0196114 | A1 * | 9/2005 | Xu et al. ...................... 385/123 |
| 2006/0023280 | A1 | 2/2006 | Mossberg |
| 2006/0139712 | A1 | 6/2006 | Mossberg |
| 2006/0177178 | A1 | 8/2006 | Greiner et al. |
| 2006/0193553 | A1 | 8/2006 | Mossberg |
| 2006/0210214 | A1 * | 9/2006 | Uhlhorn et al. ............... 385/14 |
| 2006/0233493 | A1 | 10/2006 | Mossberg |
| 2007/0019910 | A1 | 1/2007 | Greiner et al. |
| 2007/0034730 | A1 | 2/2007 | Mossberg et al. |
| 2007/0053635 | A1 | 3/2007 | Iazikov et al. |

OTHER PUBLICATIONS

Deri et al, IEEE Photonics Tech. Lett., vol. 6 No. 2 pp. 242-244 (Feb. 1994).
Grunnet-Jepsen et al, Electron. Lett., vol. 35 No. 13 pp. 1096-1097 (Jun. 1999).
Paddon et al, Opt. Lett., vol. 23 No. 19 pp. 1529-1531 (1998).
Madsen et al, IEEE J. Sel. Top. Quant. Elec., vol. 4 No. 6 pp. 925-929 (Nov./Dec. 1998).
Gini et al, J. Lightwave Tech., vol. 16 no. 4 pp. 625-630 (Apr. 1998).
Day et al, J. Lightwave Tech., vol. 14 No. 8 pp. 1815-1824 (Aug. 1996).
McGreer, IEEE Photonics Tech. Lett., vol. 7 No. 3 pp. 324-326 (Mar. 1995).
Takenouchi et al, Optics Express, vol. 6 No. 6 pp. 124-135 (Mar. 2000).
Grunnett-Jepsen et al, Photonics Tech. Lett., vol. 11 No. 10 p. 1283 (Oct. 1999).
Babbitt et al, Opt. Commun., vol. 148 pp. 23-26 (1998).
Brigham et al, Analysis of scattering from large planar gratings of compliant ctlindrical shells, J. Acoust. Soc. Am., vol. 61 No. 1 pp. 48-59 (Jan. 1977).
Kurokawa et al, Electron. Lett., vol. 33 No. 22 pp. 1890-1891 (Oct. 1997).
Sudbo et al, J. Lightwave Tech., vol. 8 No. 6 pp. 998-1006 (Jun. 1990).
Henry, J. Lightwave Tech., vol. 8 No. 5 pp. 748-755 (May 1990).
Koontz et al, Appl. Phys. Lett., vol. 71 No. 10 pp. 1400-1402 (Sep. 1997).
Song et al, Appl. Opt., vol. 34 No. 26 pp. 5913-5919 (Sep. 1995).
Brazas et al, Appl. Opt., vol. 34 No. 19 pp. 3786-3792 (Jul. 1995).
Bates et al, Appl. Opt., vol. 32 No. 12 pp. 2112-2116 (Apr. 1993).
Wang et al, Appl. Opt., vol. 32 No. 14 pp. 2606-2613 (May 1993).
Magnusson et al, Appl. Phys. Lett., vol. 61 No. 9 pp. 1022-1024 (Aug. 1992).
Ojha et al, Demonstration of low loss integrated InGaAsP/InP demultiplexer device with low polarisation sensitivity, Electron, Lett., vol. 29 No. 9 p. 805 (Apr. 1993).
Li, Opt. Commum., vol. 114 pp. 406-412 (1995).
Soole et al, Electron. Lett., vol. 31 No. 15 pp. 1276-1277 (Jul. 1995).
Rantala et al, Electron. Lett. vol. 34 No. 5 pp. 455-456 (Mar. 1998).

Cowin et al Electron. Lett., vol. 35 No. 13 pp. 1074-1076 (Jun. 1999).

Canning et al, Opt. Commun., vol. 171 pp. 213-217 (1999).

Tien et al, Use of concentric-arc grating as a thin-film spectrograph for guided waves, Am. Inst. of Physics (1980) pp. 524-525.

Kaneko et al, IEEE J. Sel. Top. Quant. Elec., vol. 5 No. 5 pp. 1227-1236 (Sep./Oct. 1999).

Sun et al, IEEE Photonics Tech. Lett., vol. 10 No. 1 pp. 90-92 (Jan. 1998).

McGreer, IEEE Photonics Tech. Lett., vol. 8 No. 4 pp. 551-553 (Apr. 1996).

Avrutsky et al, IEEE Photonics Tech. Lett., vol. 10 No. 6 pp. 839-841 (Jun. 1998).

Alavie et al, IEEE Photonics Tech. Lett., vol. 5 No. 9 pp. 1112-1114 (Sep. 1993).

Fu et al, Opt. Lett., vol. 22 No. 21 pp. 1627-1629 (1997).

Wang et al, IEEE Photonics Tech. Lett., vol. 3 No. 1 pp. 36-38 (Jan. 1991).

Wang et al Opt. Lett., vol. 15 No. 7 pp. 363-365 (Apr. 1990).

Wu et al, J. Lightwave Tech., vol. 10 No. 11 pp. 1575-1589 (Nov. 1992).

Eldada et al, IEEE Photonics Tech. Lett., vol. 12 No. 7 pp. 819-821 (Jul. 2000).

Chen et al, J. Lightwave Tech., vol. 10 No. 7 pp. 888-897 (Jul. 1992).

Minier et al, Diffraction characteristics of superimposed holographic gratings in planar optical waveguides, IEEE Photonics Tech. Lett., vol. 4 No. 10 p. 1115 (Oct. 1992).

Miya, IEEE J. Sel. Top. Quant. Elec., vol. 6 No. 1 pp. 38-45 (Jan./Feb. 2000).

Backlund et al, IEEE Photonics Tech. Lett., vol. 12 No. 3 pp. 314-316 (Mar. 2000).

Wiseman et al, IEEE Photonics Tech. Lett., vol. 12 No. 6 pp. 639-641 (Jun. 2000).

Ura et al, Integrated optical wavelength demultiplexer using a coplanar grating lens, Appl. Opt., vol. 29 No. 9 pp. 1369-1373 (Mar. 1990).

Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991).

Babbitt et al, Opt. Lett., vol. 20 No. 8 pp. 910-912 (Apr. 1995).

Mossberg, Opt. Lett., vol. 26 No. 7 pp. 414-416 (Apr. 2001).

Tang et al, A novel wavelength-division-demultiplexer with optical in-plane to surface-normal conversion, IEEE Photonics Tech. Lett., vol. 7 No. 8 p. 908 (Aug. 1995).

Brady et al, Applied Optics, vol. 30 No. 17 p. 2324 (Jun. 1991).

Preston, "Digital holographic logic", Pattern Recognition, vol. 5, p. 37 (1973).

Hirayama et al, Applied Physics Letters, vol. 69 No. 6 p. 791 (Aug. 5, 1996).

Lohmann et al, Applied Optics, vol. 34 No. 17 p. 3172 (Jun. 10, 1995).

Bedford et al, IEEE Photonics Technology Letters, vol. 12 No. 8 p. 948 (Aug. 2000).

Kristjansson etal, IEEE Photonics Technology Letters, vol. 12 No. 10 p. 1319 (Oct. 2000).

Modh et al, IEEE J. Quantum Electronics, vol. 37 No. 6 p. 752 (Jun. 2001).

Eriksson et al, IEEE J. Quantum Electronics, vol. 34 No. 5 p. 858 (May 1998).

Kazarinov et al, IEEE J. Quantum Electronics, vol. QE-23 No. 9 p 1419 (Sep. 1987).

Eriksson et al, IEEE Photonics Technology Letters, vol. 9 No. 12 p. 1570 (Dec. 1997).

\* cited by examiner

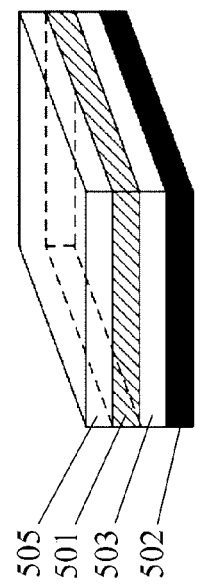
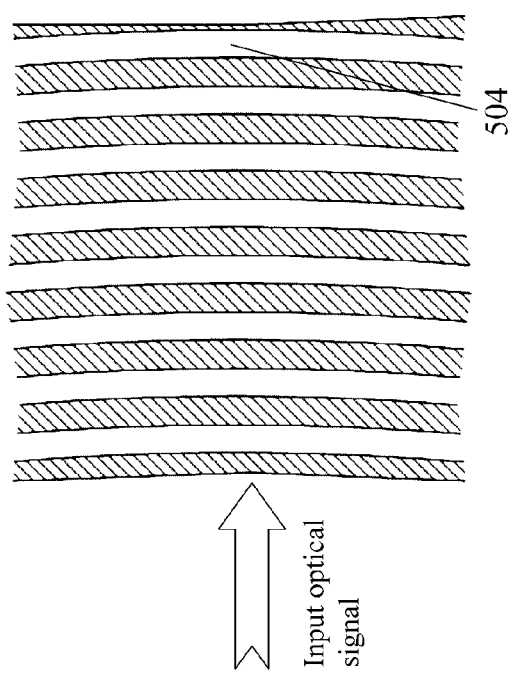
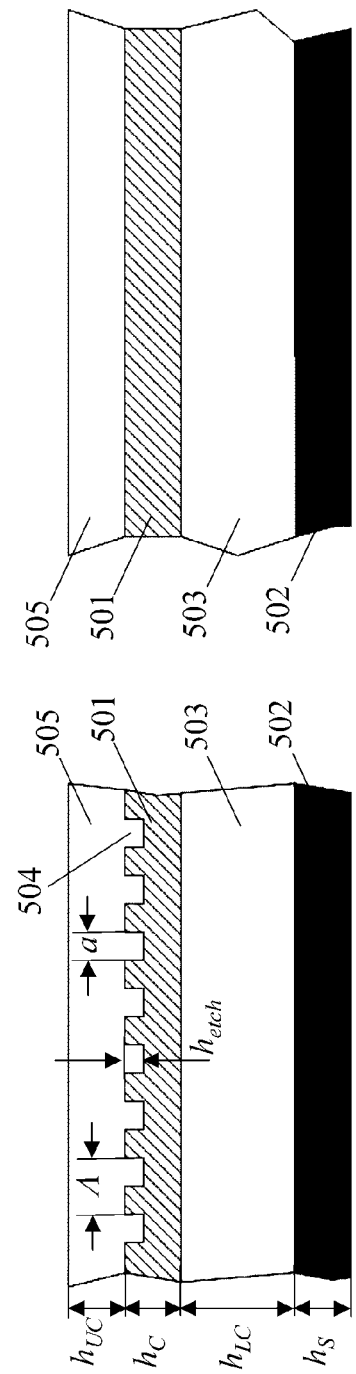

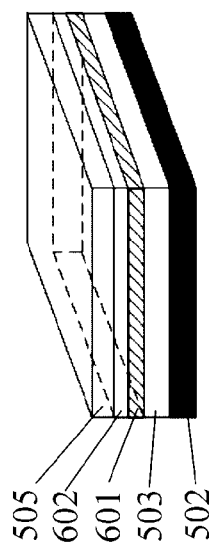
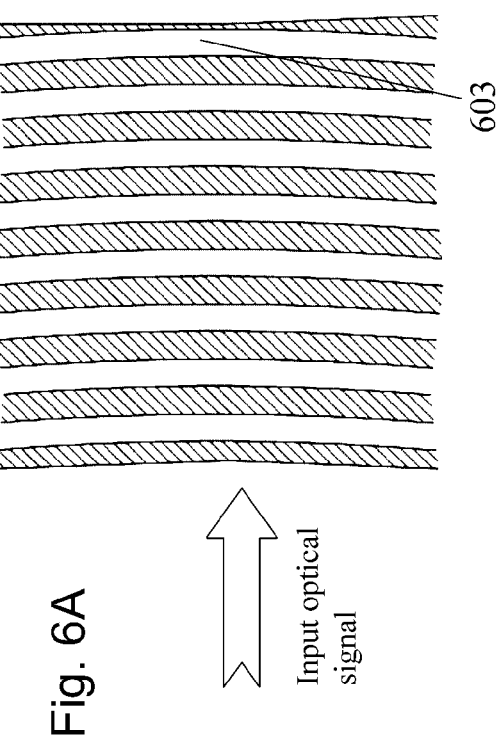
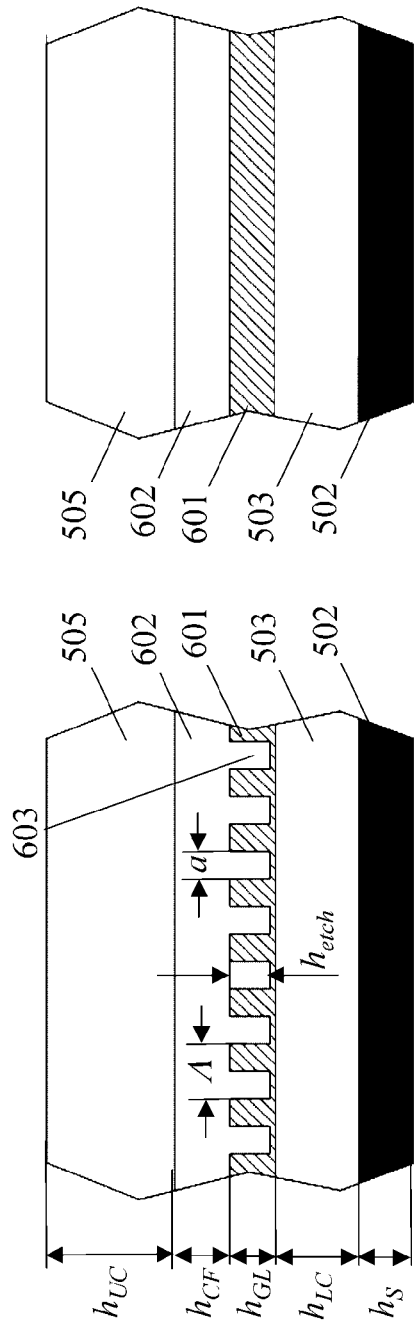

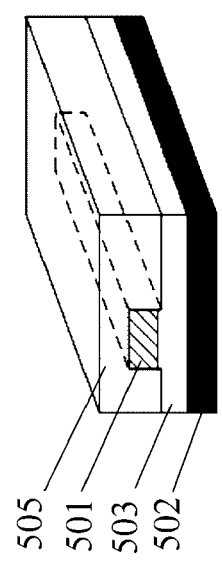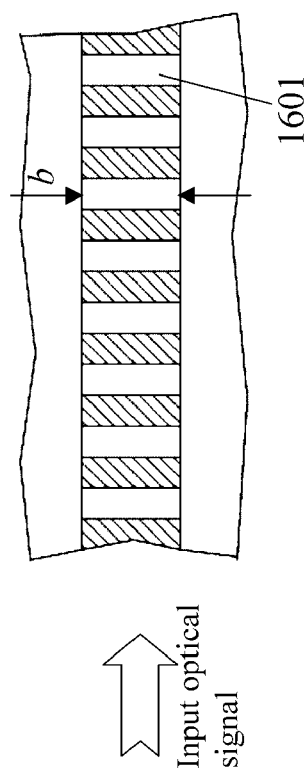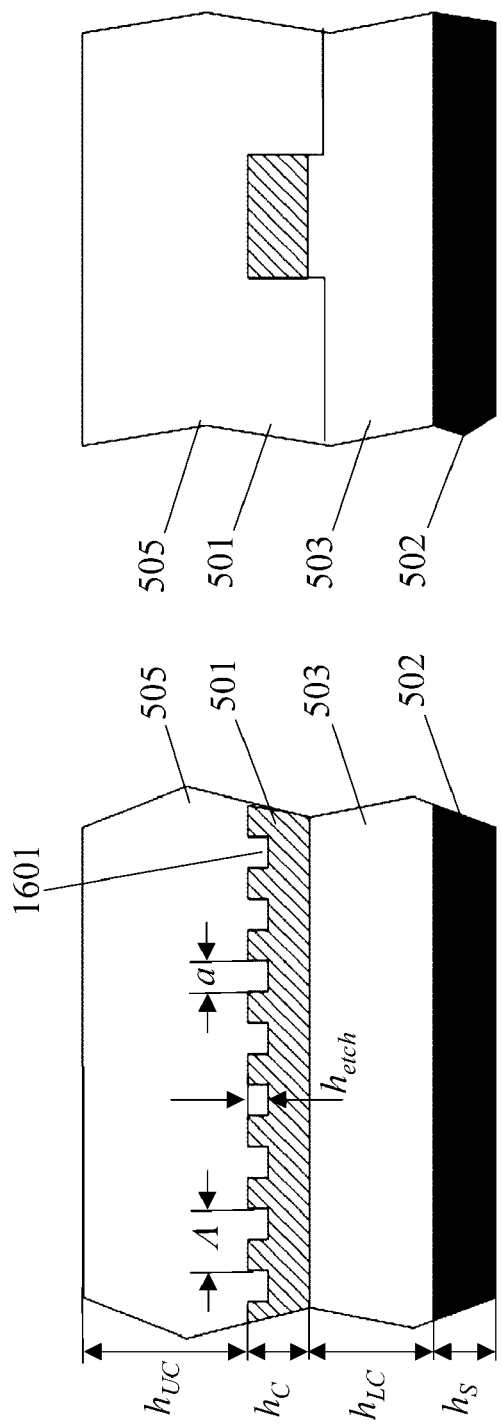

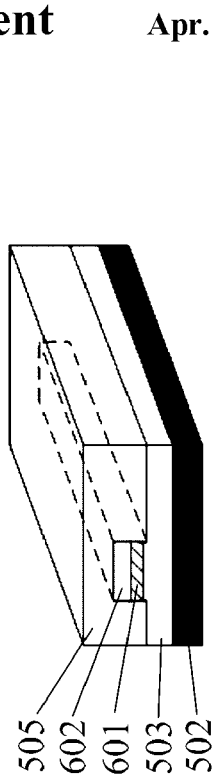
Fig. 17D
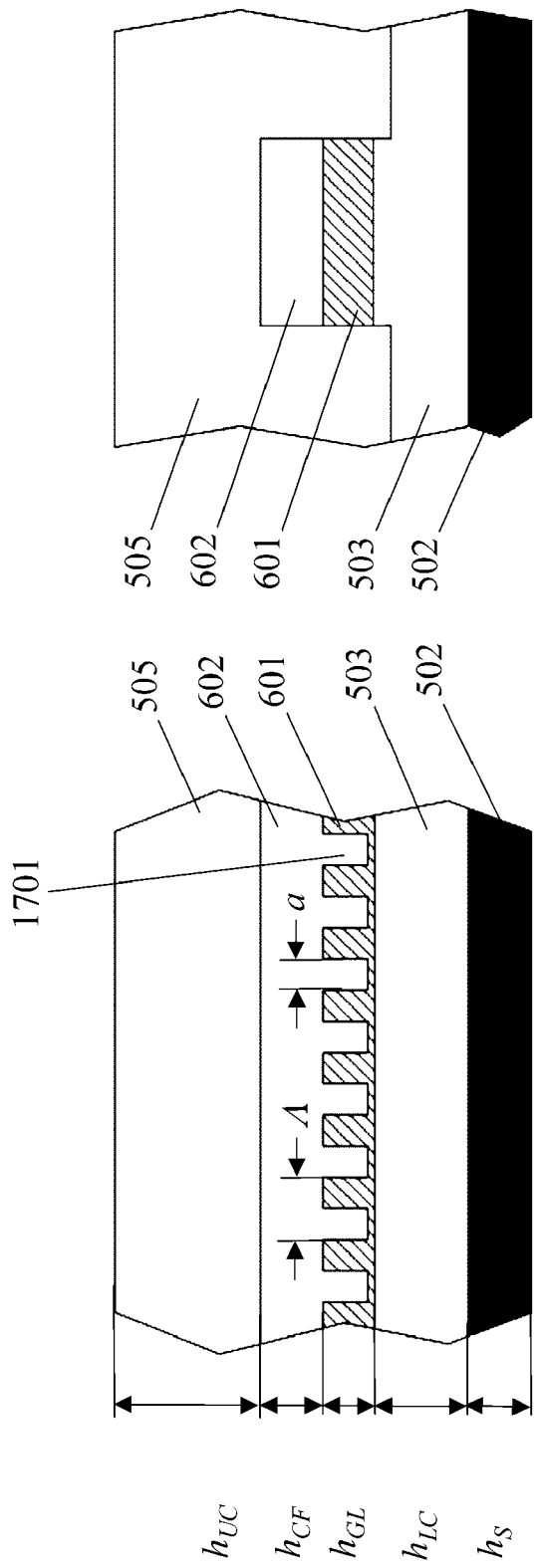
Fig. 17C
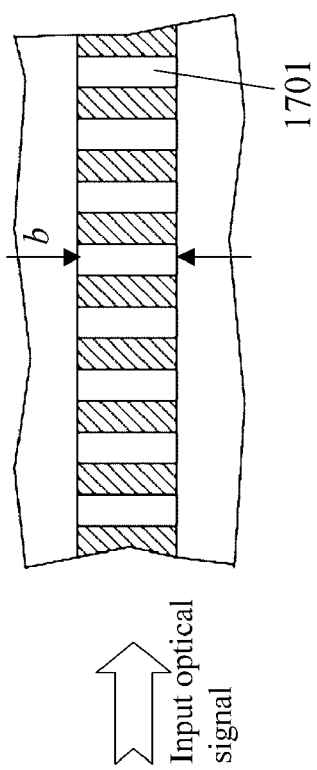
Fig. 17A
Fig. 17B

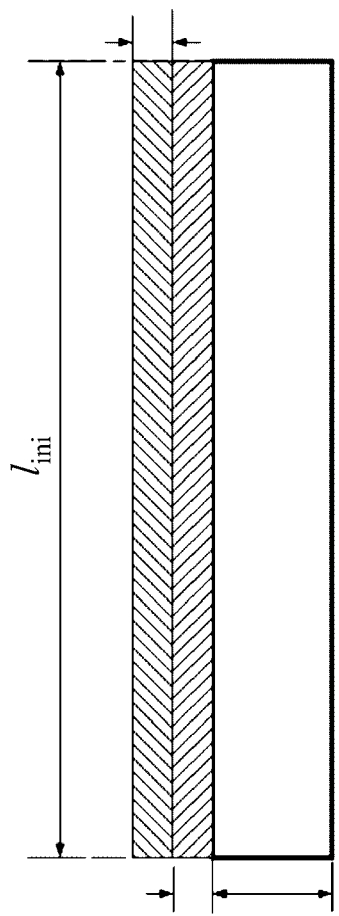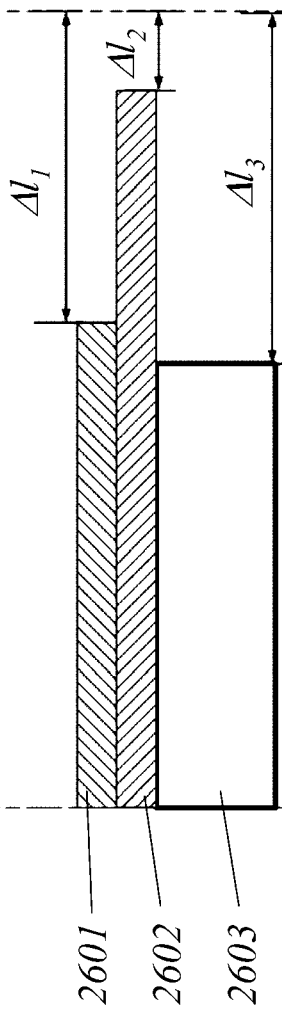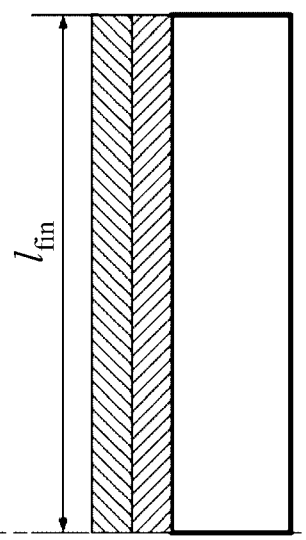

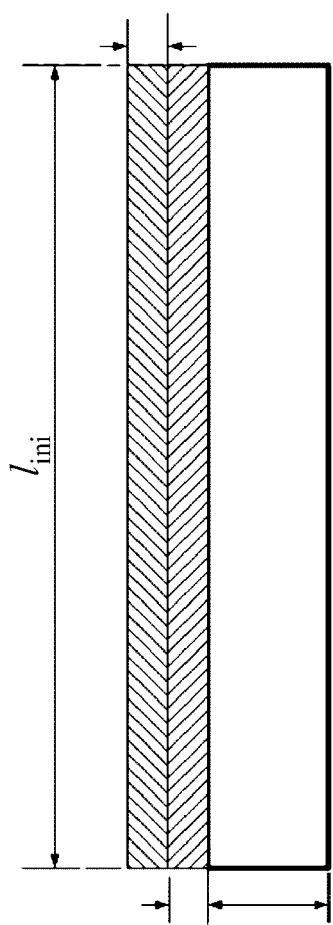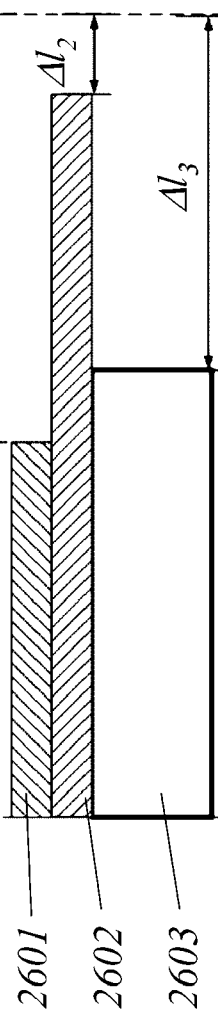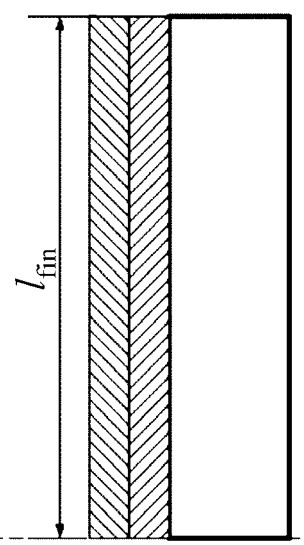

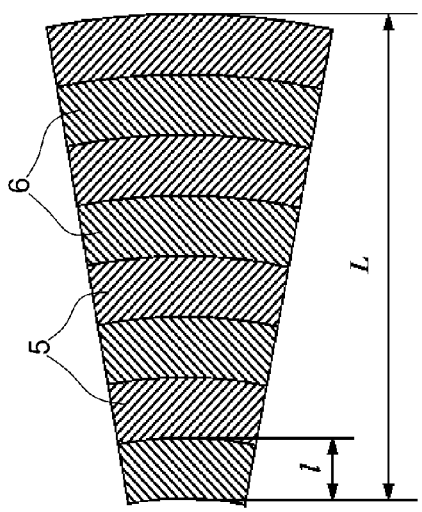
FIG. 31
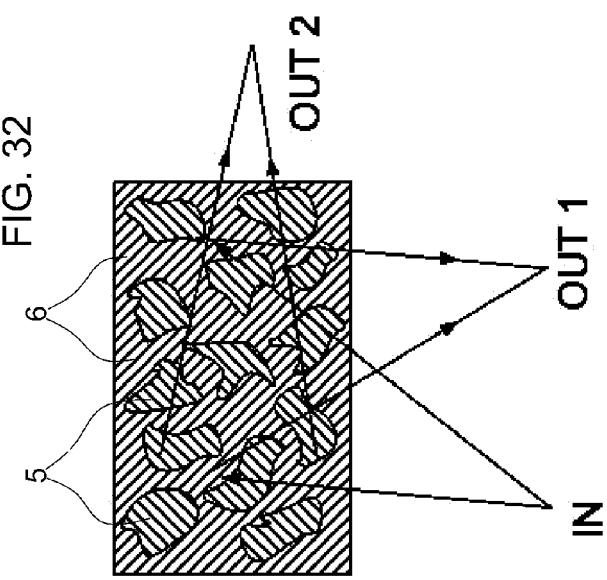
FIG. 32
FIG. 33

BIREFRINGENCE CONTROL IN PLANAR OPTICAL WAVEGUIDES

BENEFIT CLAIMS TO RELATED APPLICATIONS

This application claims benefit of prior-filed co-pending provisional App. No. 60/604,111 filed Aug. 23, 2004, said provisional application being hereby incorporated by reference as if fully set forth herein.

BACKGROUND

The field of the present invention relates to planar optical waveguides, including planar optical waveguides incorporating distributed optical structures (e.g., diffractive element sets). In particular, planar optical waveguides exhibiting controlled levels of birefringence are disclosed herein.

One or more distributed optical structures (i.e., sets of diffractive elements) in a channel waveguide, an optical fiber, a slab waveguide, or another guided-wave optical structure may be used in a variety of devices for spectral filtering, laser frequency control, spectral multiplexing, optical sensing, or other functions. Under certain circumstances, it may be desirable for such devices to exhibit birefringence within an operationally acceptable range about a predetermined, desired level (zero or non-zero). Planar optical waveguides (slab and channel waveguides), including those having distributed optical structures, wherein the birefringence is thus controlled are disclosed herein.

Various embodiments, implementations, and adaptations of planar optical waveguides with diffractive element sets are disclosed in:

application Ser. No. 11/155,327 filed Jun. 16, 2005 in the names of Christoph M. Greiner, Thomas W. Mossberg, and Dmitri lazikov (now U.S. Pat. No. 7,190,856 issued Mar. 13, 2007);

application Ser. No. 11/076,251 filed Mar. 8, 2005 in the name of Thomas W. Mossberg (now U.S. Pat. No. 7,062,128 issued Jun. 13, 2006);

application Ser. No. 11/062,109 filed Feb. 17, 2005 in the names of Christoph M. Greiner, Thomas W. Mossberg, and Dmitri lazikov (now U.S. Pat. No. 7,181,103 issued Feb. 20, 2007);

application Ser. No. 11/055,559 filed Feb. 9, 2005 in the names of Christoph M. Greiner, Thomas W. Mossberg, and Dmitri lazikov (now U.S. Pat. No. 7,123,794 issued Oct. 17, 2006);

application Ser. No. 11/021,549 filed Dec. 23, 2004 in the names of Dmitri lazikov, Christoph M. Greiner, and Thomas W. Mossberg;

application Ser. No. 10/998,185 filed Nov. 26, 2004 in the names of Dmitri lazikov, Christoph M. Greiner, and Thomas W. Mossberg (now U.S. Pat. No. 6,993,223 issued Jan. 31, 2006);

application Ser. No. 10/989,244 filed Nov. 15, 2004 in the names of Christoph M. Greiner, Thomas W. Mossberg, and Dmitri lazikov (now U.S. Pat. No. 6,961,491 issued Nov. 1, 2005);

application Ser. No. 10/989,236 filed Nov. 15, 2004 in the names of Christoph M. Greiner, Dmitri lazikov, and Thomas W. Mossberg (now U.S. Pat. No. 6,965,716 issued Nov. 15, 2005);

application Ser. No. 10/923,455 filed Aug. 21, 2004 in the names of Thomas W. Mossberg, Dmitri lazikov, and Christoph M. Greiner (now U.S. Pat. No. 7,054,517 issued May 30, 2006);

application Ser. No. 10/898,527 filed Jul. 22, 2004 in the named of Dmitri lazikov, Christoph M. Greiner, and Thomas W. Mossberg (now U.S. Pat. No. 7,194,164 issued Mar. 20, 2007);

application Ser. No. 10/857,987 filed May 29, 2004 in the names of Lawrence D. Brice, Christoph M. Greiner, Thomas W. Mossberg, and Dmitri lazikov (now U.S. Pat. No. 6,990,276 issued Jan. 24, 2006);

application Ser. No. 10/842,790 filed May 11, 2004 in the names of Thomas W. Mossberg, Christoph M. Greiner, and Dmitri lazikov (now U.S. Pat. No. 6,987,911 issued Jan. 17, 2006);

application Ser. No. 10/798,089 filed Mar. 10, 2004 in the names of Christoph M. Greiner, Thomas W. Mossberg, and Dmitri lazikov (now U.S. Pat. No. 6,823,115 issued Nov. 23, 2004);

application Ser. No. 10/794,634 filed Mar. 5, 2004 in the names of Dmitri lazikov, Thomas W. Mossberg, and Christoph M. Greiner (now U.S. Pat. No. 6,985,656 issued Jan. 10, 2006);

application Ser. No. 10/740,194 filed Dec. 17, 2003 in the names of Dmitri lazikov, Thomas W. Mossberg, and Christoph M. Greiner (now U.S. Pat. No. 7,224,855 issued May 29, 2007);

application Ser. No. 10/653,876 filed Sep. 2, 2003 in the names of Christoph M. Greiner, Dmitri lazikov, and Thomas W. Mossberg (now U.S. Pat. No. 6,829,417 issued Dec. 7, 2004);

application Ser. No. 10/602,327 filed Jun. 23, 2003 in the name of Thomas W. Mossberg (now U.S. Pat. No. 6,859,318 issued Feb. 22, 2005);

application Ser. No. 10/229,444 filed Aug. 27, 2002 in the names of Thomas W. Mossberg and Christoph M. Greiner (now U.S. Pat. No. 6,678,429 issued Jan. 13, 2004);

application Ser. No. 09/843,597 filed Apr. 26, 2001 in the name of Thomas W. Mossberg (now U.S. Pat. No. 6,965,464 issued Nov. 15, 2005); and application Ser. No. 09/811,081 filed Mar. 16, 2001 in the name of Thomas W. Mossberg (now U.S. Pat. No. 6,879,441 issued Apr. 12, 2005).

Each of said applications and patents is hereby incorporated by reference as if fully set forth herein. For one or more of the references incorporated hereinabove, it may be the case that the devices, structures, embodiments, implementations, adaptations, procedures, or techniques disclosed therein may be employed for implementing the subject matter or inventive concepts disclosed or claimed herein. Conversely, the subject matter or inventive concepts disclosed or claimed herein may be employed for implementing the devices, structures, embodiments, implementations, adaptations, procedures, or techniques disclosed in one or more of the references incorporated hereinabove.

SUMMARY

An optical apparatus comprises a planar optical waveguide having at least one set of diffractive elements, the planar optical waveguide substantially confining in at least one transverse spatial dimension optical signals propagating therein. Each diffractive element set routes, between corresponding input and output optical ports, a corresponding diffracted portion of an input optical signal propagating in the planar optical waveguide that is diffracted by the diffractive element set. The input optical signal is successively incident on the diffractive elements. The optical signals propagate in the planar optical waveguide in corresponding signal optical transverse modes substantially confined in at least one transverse dimension by the planar optical waveguide. A desired level of birefringence for a chosen one of the signal optical transverse modes is determined at least in part by i) a selected areal density of diffractive elements, ii) a selected diffractive element height and selected diffractive element position along the confined transverse spatial dimension, iii) selected thicknesses and selected indices of materials comprising the diffractive elements, or iv) selected thicknesses and selected stress-optical coefficients of materials comprising the planar optical waveguide, and selected non-negligible thermal expansion coefficient differentials among materials comprising the planar optical waveguide or a waveguide substrate thereof.

Objects and advantages pertaining to birefringence control in an optical waveguide may become apparent upon referring to the disclosed exemplary embodiments as illustrated in the drawings and disclosed in the following written description and/or claims.

BRIEF DESCRIPTION OF THE DRAWINGS

FIGS. 5A-5D are schematic top, side cross-sectional, end cross-sectional, and perspective views of an exemplary slab waveguide with diffractive elements.

FIGS. 6A-6D are schematic top, side cross-sectional, end cross-sectional, and perspective views of an exemplary slab waveguide with diffractive elements.

FIGS. 16A-16D are schematic top, side cross-sectional, end cross-sectional, and perspective views of an exemplary channel waveguide with diffractive elements.

FIGS. 17A-17D are schematic top, side cross-sectional, end cross-sectional, and perspective views of an exemplary channel waveguide with diffractive elements.

FIGS. 26A-26C and 26D-26F schematically illustrate thermal expansion coefficient (TEC) mismatch among layers of an exemplary planar waveguide.

FIGS. 31-33 illustrate schematically exemplary planar waveguides having multiple diffractive element sets.

Figure 1:
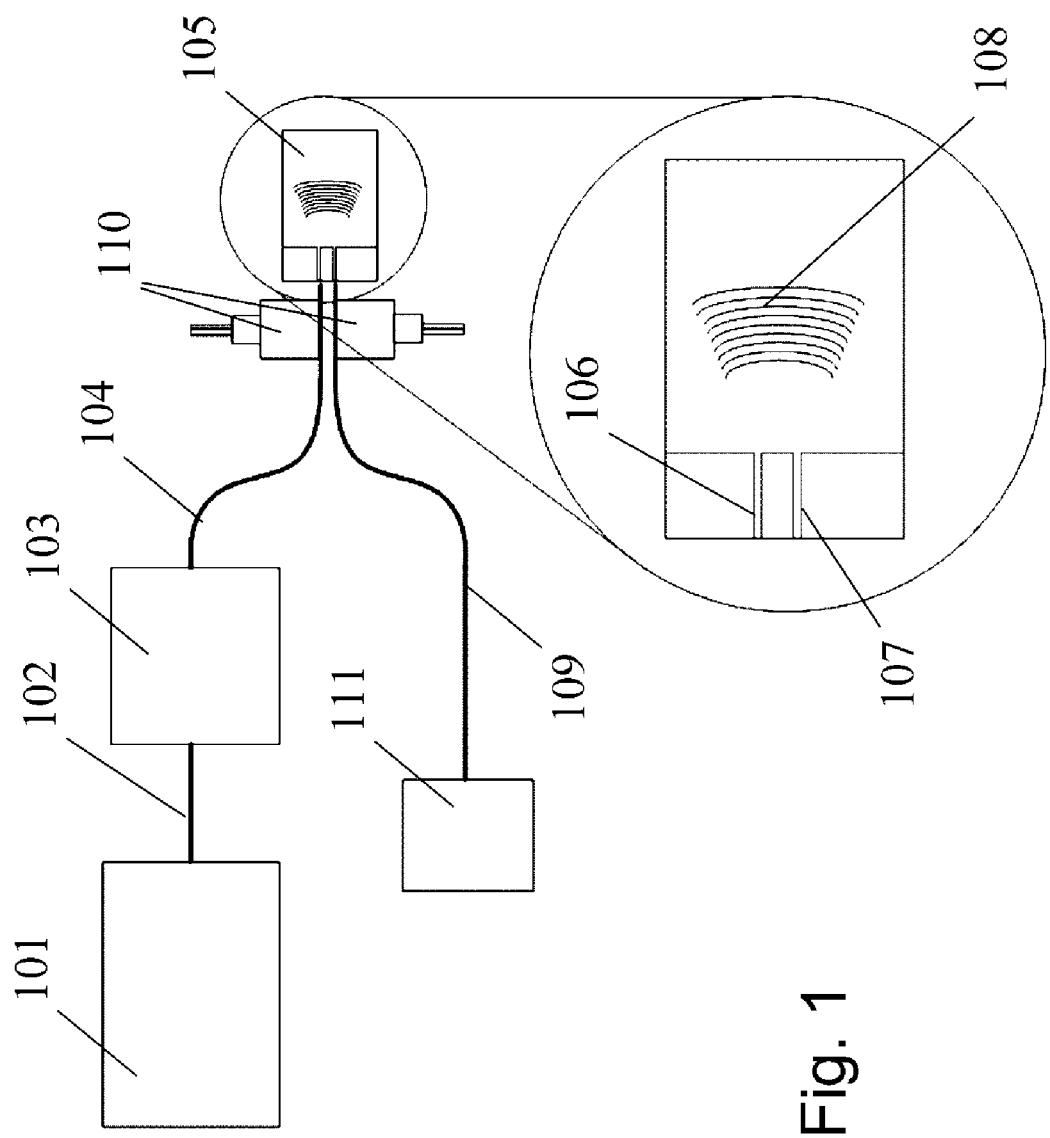
FIG. 1 is a schematic illustration of a test set for measuring birefringence in a slab waveguide.

In the Figures, typically only a few diffractive elements are shown out of an entire diffractive element set, which may contain anywhere from a few, dozens, hundreds, or even thousands of diffractive elements. The Figures may illustrate the waveguide or diffractive elements schematically, and therefore may not show all structures in their proper shape or proportions. In many of the Figures, an optical waveguide and the diffractive elements thereof are shown in cross section. Unless specifically stated otherwise, such cross-sectional Figures may represent both channel and slab waveguides, as well as other guided-wave optical structures. The local direction of optical propagation (i.e., the longitudinal dimension) is substantially horizontal (with respect to both the orientation of such Figures as well as a substantially horizontal planar waveguide substrate, which may be present but may not be shown in all of the Figures). Two transverse dimensions are defined locally as perpendicular to the local longitudinal dimension. For both channel and slab waveguides the supported optical modes are substantially confined in the vertical transverse dimension of the cross-sectional Figures (vertical with respect to both the orientation of the Figure as well as a substantially horizontal planar waveguide substrate, if present). The horizontal transverse dimension is substantially normal to the plane of such Figures, and substantially parallel to a planar waveguide substrate (if present); a slab waveguide permits optical signal propagation in said horizontal transverse dimension, while a channel optical waveguide substantially confines the optical signal in the horizontal transverse dimension.

The embodiments shown in the Figures are exemplary, and should not be construed as limiting the scope of the present disclosure or appended claims.

DETAILED DESCRIPTION OF EMBODIMENTS

General Description of Planar Optical Waveguides with Diffractive Elements

An optical apparatus according to the present disclosure comprises an optical element having at least one set of diffractive elements. The optical element may comprise a planar optical waveguide substantially confining in at least one transverse spatial dimension optical signals propagating therein. The confined optical signals typically propagate as transverse optical modes supported, guided, or confined by the waveguide layers of the planar waveguide. These optical modes are particular solutions of the electromagnetic field equations in the space occupied by the waveguide layers. In addition, the planar waveguide may include additional layers, such as a substrate layer(s), protective layer(s), and so forth. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides. More generally, the adaptations disclosed or claimed herein may be implemented in any guided-wave optical structure, including grating-like structures.

A simple planar waveguide may comprise a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) The core or cladding(s) may comprise multiple material regions or layers having different indices. A planar waveguide may support one or more transverse modes, depending on the dimensions, structure, and refractive indices of the core and cladding. A wide range of material types may be employed for fabricating a planar waveguide, including but not limited to glasses, polymers, plastics, semiconductors, combinations thereof, or functional equivalents thereof. The planar waveguide may be formed on or secured to a substrate for facilitating manufacture, for mechanical support, and/or for other reasons. The waveguide layer(s) of a planar waveguide typically support or guide one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). For a planar waveguide, the diffracting regions of each diffractive element of the set typically comprises some suitable alteration of the planar waveguide (ridge, groove, index modulation, density modulation, and so on), and is spatially defined with respect to a virtual one- or two-dimensional linear or curvilinear diffractive element contour, the curvilinear shape of the contour typically being configured to impart desired spatial characteristics onto the diffracted portion of the optical signal. It should be noted that the terms "diffractive contour" and "diffractive element" are sometimes used interchangeably in the present disclosure. Implementation of a diffractive element with respect to its virtual contour may be achieved in a variety of ways, including any of those disclosed in the references listed and incorporated hereinabove. Each linear or curvilinear diffractive element is shaped to direct its diffracted portion of the optical signal to an output optical port. The relative spatial arrangement (e.g. longitudinal spacing) of the diffractive elements of the set, and the relative amplitude diffracted from each diffractive element of the set, yield desired spectral and/or temporal characteristics for the overall diffracted optical signal routed between the corresponding input and output optical ports. It should be noted that an optical port (input or output) may be defined structurally (for example, by an aperture, waveguide, fiber, lens, or other optical component) and/or functionally (for example, by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

A given set of diffractive elements provides dual functionality, spatially routing a diffracted portion of an optical signal between an input optical port and an output optical port, while at the same time acting to impart a spectral/temporal transfer function onto the diffracted portion of an input optical signal to yield an output optical signal. The diffractive elements may be designed (by computer generation, for example) so as to provide optimal routing, imaging, or focusing of the optical signal between an input optical port and a desired output optical port, thus reducing or minimizing insertion loss (at least with respect to contour shape). Simple linear or curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure or appended claims. Particular attention is called to design and fabrication techniques disclosed in the references listed and incorporated hereinabove. The following are exemplary only, and are not intended to be exhaustive. The teachings of the present disclosure pertaining to controlling birefringence in a planar waveguide (with or without a diffractive element set) may be implemented regardless of the method(s) employed for forming the planar waveguide or diffractive element set(s) thereof.

Diffractive elements may be formed lithographically on the surface of a planar optical waveguide, or at one or both interfaces between core and cladding of a planar optical waveguide, or at one or more interfaces between core sublayers of differing compositions or between cladding sublayers of differing compositions. Diffractive elements may be formed lithographically in the interior of a core layer or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask onto the surface of the planar waveguide (referred to herein as external photo-exposure) so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter. The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references listed and incorporated hereinabove).

An alternative approach to designing the diffractive element contours for a diffractive element set is disclosed in application Ser. No. 11/055,559 (listed and incorporated hereinabove), and comprises calculating interference patterns between simulated fields at a desired wavelength and with desired waveforms entering the input port and exiting the output port. In forming or writing a summed pattern for the diffractive element set, suitable discretization is applied as needed for any lithographic or UV exposure approach that is utilized for fabrication. The holographic structure may be designed by calculated interference of computer-generated beams having the desired computer-generated temporal waveforms, with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped as they propagate in the planar waveguide (referred to herein as internal photoexposure), thereby recording in the planar waveguide an interference pattern. Subsequently the photosensitive material is developed and, if necessary, a cladding may be deposited or attached by other means.

The phrase "operationally acceptable" appears herein describing levels of various performance parameters of planar waveguides and diffractive element sets thereof. Such parameters may include optical coupling coefficient (equivalently, optical coupling efficiency), diffraction efficiency, insertion loss, birefringence, polarization-dependent wavelength shift (PDWS), and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a larger polarization-dependent wavelength shift may be an acceptable trade-off for achieving lower device fabrication costs in some instances, while a lower polarization-dependent wavelength shift may be required in other instances in spite of higher fabrication costs. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Words such as "substantially" or phrases containing such words, as used herein, shall be construed in light of this notion of "operationally acceptable" performance. Similarly, phrases describing quantities such as "a desired level of birefringence", "selected areal density", "selected thicknesses", "selected indices", "selected thermal expansion coefficient", "selected stress-optical coefficient", and so forth, as used in the written description or appended claims, shall be construed as specifying the quantity within an operationally acceptable range of the "desired" or "selected" quantity. The size of such an operationally acceptable range will vary according to the requirements of a specific apparatus, as described hereinabove.

General Description of Birefringence in Planar Optical Waveguides

A planar optical waveguide will typically support propagating modes polarized either parallel or perpendicular to the waveguide substrate (referring to the electric field vector associated with the optical mode). Modes having their corresponding electric field vectors polarized parallel to the waveguide substrate are referred to as TE modes, while modes having their corresponding electric field vectors polarized perpendicular to the waveguide substrate are referred to as TM modes. TE modes are sometimes referred to as "horizontally" polarized, while TM modes are sometimes referred to as "vertically" polarized. Birefringence of a planar optical waveguides is the difference in effective refractive indices of the TE and TM modes, $n_{\mathit{eff:TE}}$ and $n_{\mathit{eff:TM}}$, respectively. Birefringence B may be defined as $B \equiv n_{\mathit{eff:TE}} - n_{\mathit{eff:TM}}$.

Birefringence in a waveguide having a diffractive element set may result in differing spectral/temporal transfer functions for TE and TM polarizations. For example, in a simple case of a diffractive element set with a uniform element spacing $\Lambda$ and effective indices $n_{\mathit{eff:TE}}$ and $n_{\mathit{eff:TM}}$, the respective central diffracted wavelengths $\lambda_{TE}$ and $\lambda_{TM}$ will differ, with $$\lambda_{TE} - \lambda_{TM} = 2m\Lambda(n_{\mathit{eff:TE}} - n_{\mathit{eff:TM}}) = 2m\Lambda B \qquad (1)$$

where m=1, 2, 3, . . . is the diffractive order. The quantity $(\lambda_{TE} - \lambda_{TM})$ is defined as the "polarization-dependent wavelength shift" (hereinafter, PDWL). Such a polarization-dependent wavelength shift may result in differing levels of insertion loss or reflectivity at a given wavelength for different polarization states, differing spectral transfer functions for different polarization states, or other potentially undesirable polarization-dependent behavior for the diffractive element set.

The effects of birefringence may be significant and undesirable, e.g., in a spectral filter having a passband width comparable to the polarization-dependent wavelength shift. In situations wherein the polarization state of an incoming optical signal is not constant or is not predictable, such a polarization-dependent wavelength shift may result in uncontrolled fluctuations in the power of the output optical signal. Such situations may arise, for example, when the input optical signal is delivered by a non-polarization-maintaining optical fiber that experiences variable or unknown mechanical stress (a common scenario in optical communications). Depending on the particular use for the filter, various amounts of birefringence or PDWL may be tolerated (i.e., may be within operationally acceptable limits). In a dense wavelength-division multiplexing (DWDM) scheme with 100 GHz channel spacing, for example, a requirement that polarization-dependent loss remain less than 0.5 dB restricts PDWL to less than 0.03 nm, which in turn requires birefringence of less than about $2 \times 10^{-5}$ at a wavelength of 1.55 μm and an index of 1.46. For coarse WDM, however, birefringence as large as $5 \times 10^{-4}$ might be tolerated. In still other circumstances, it may be desirable or advantageous to employ an optical device having a selected, non-zero polarization-dependent wavelength shift.

Birefringence in a planar optical waveguide may arise in a variety of ways, including but not limited to the following. One or more of the materials comprising the planar waveguide may be intrinsically birefringent. So-called "form birefringence" arises from geometric anisotropy in the distribution of refractive indices in the waveguide structure. Differing thermal expansion coefficients result in mechanical strain between differing waveguide or substrate materials upon cooling from elevated processing temperatures, the mechanical strain in turn resulting in strain-induced birefringence (via the respective stress-optical coefficients). The strain distribution may be modified by etching or other processing to form diffractive elements in the waveguide.

The resulting model of the birefringence may be complex, to the extent that sufficiently accurate and precise analytic or numerical modeling may or may not be possible for a given planar waveguide. When adequate modeling is not possible, empirical calibration of waveguide parameters affecting birefringence may be performed.

General Experimental Considerations

Figure 2:
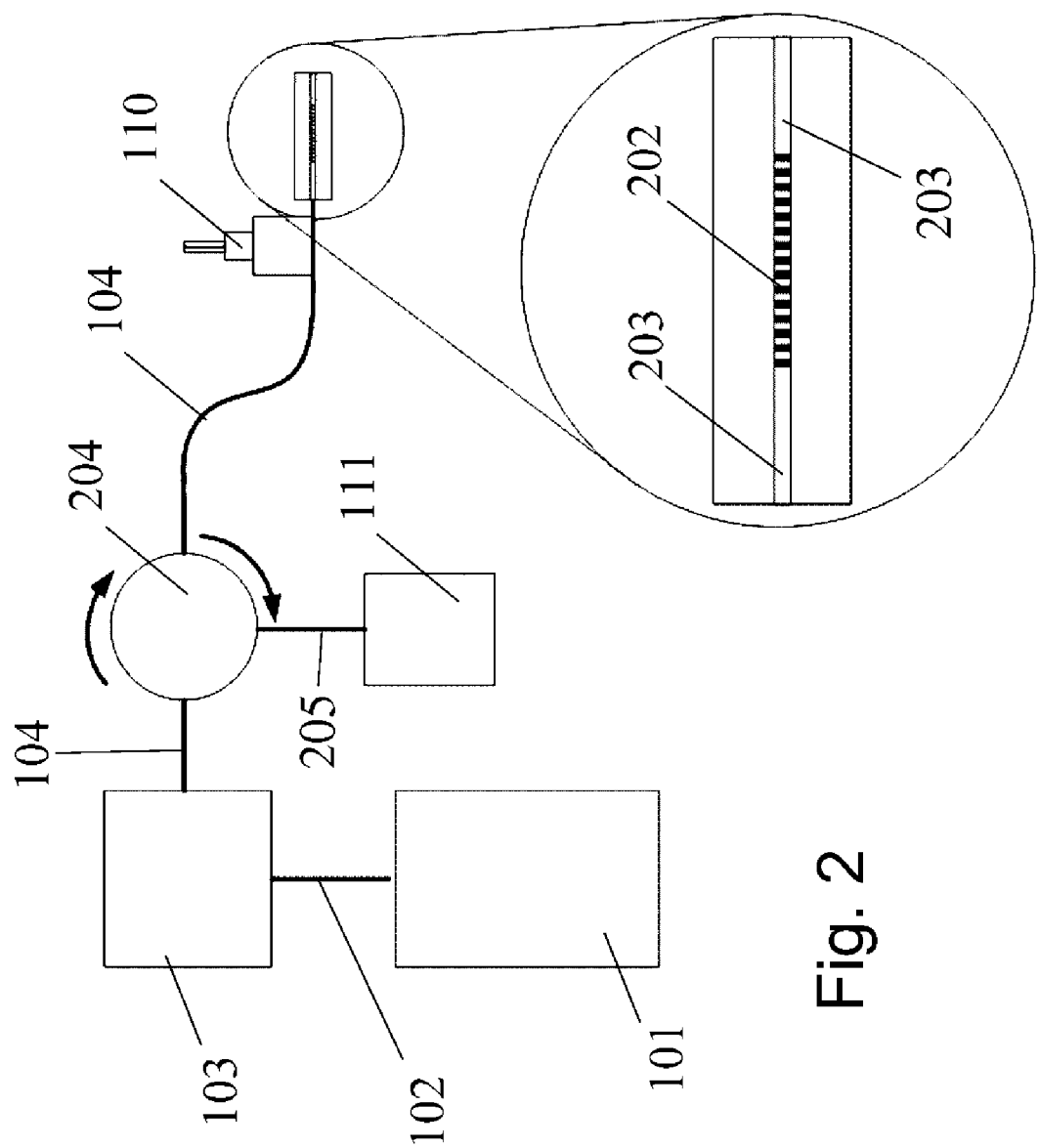
FIG. 2 is a schematic illustration of a test set for measuring birefringence in a channel waveguide.
Figure 3:
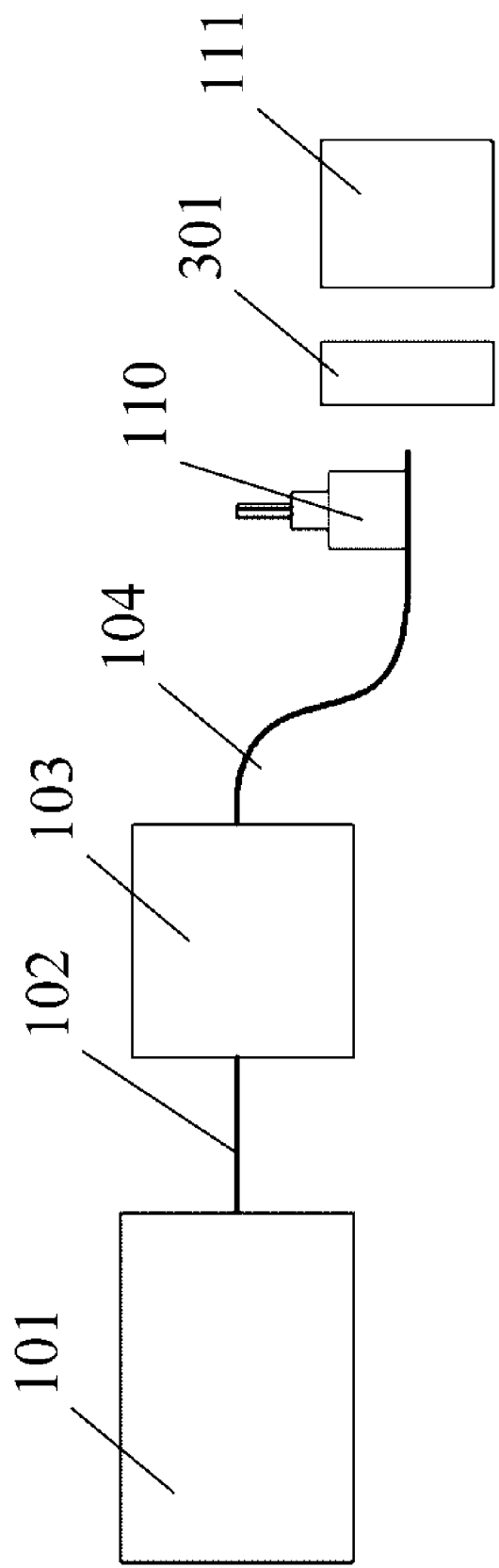
FIG. 3 is a schematic illustration of a test set for measuring birefringence in a slab waveguide.
Figure 4:
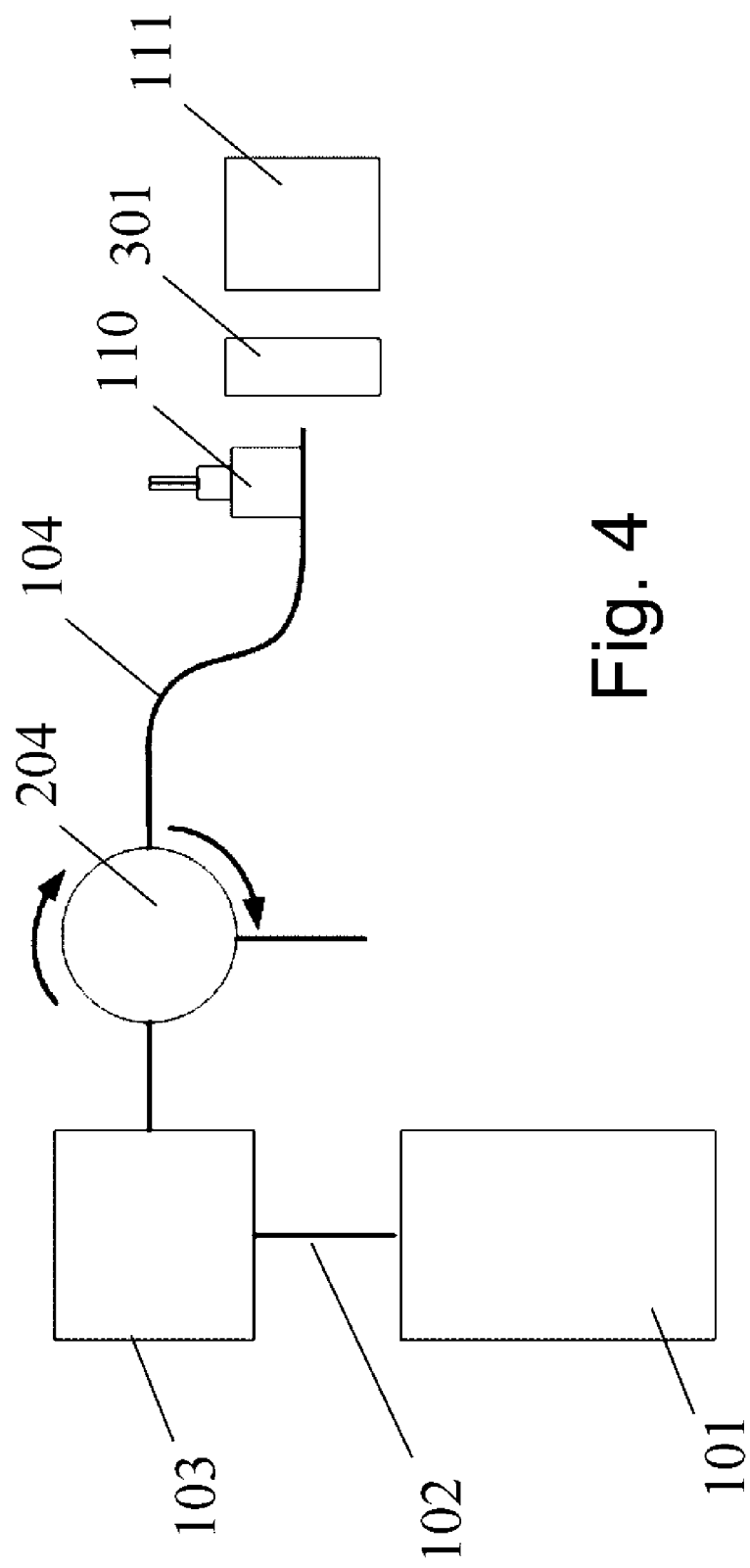
FIG. 4 is a schematic illustration of a test set for measuring birefringence in a channel waveguide.
Figure 7D:
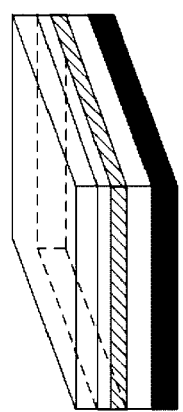
FIGS. 7A-7D are schematic top, side cross-sectional, end cross-sectional, and perspective views of an exemplary slab waveguide with diffractive elements.
Figure 7C:
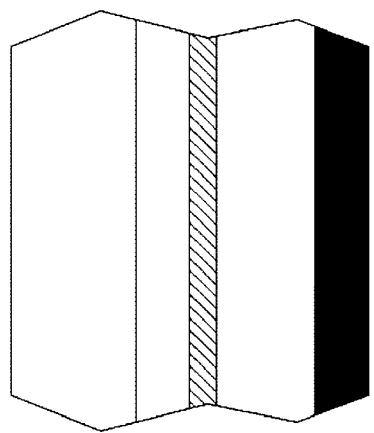
Figure 7A:
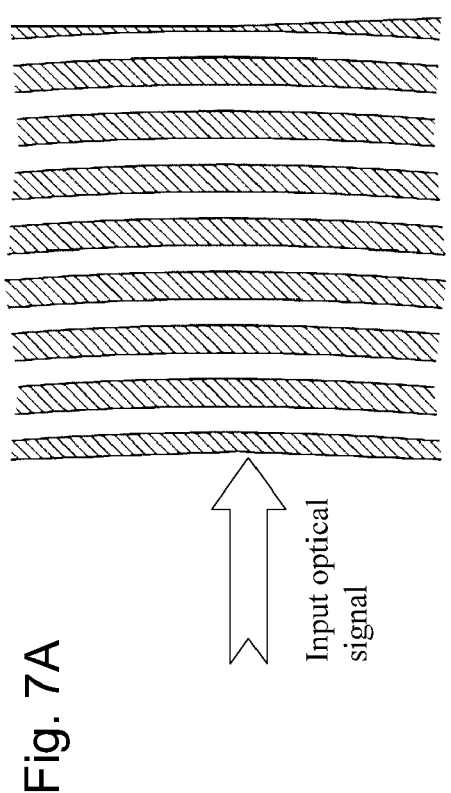
Figure 7B:
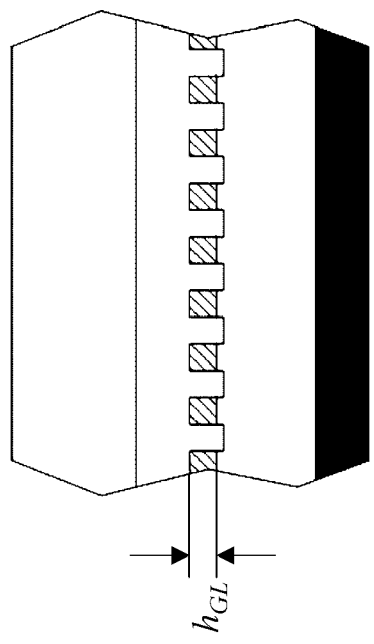

Measured spectra shown herein were acquired using one or more of the apparatus schematically illustrated in FIGS. 1-4. FIG. 1 shows a fiber-coupled tunable laser 101 connected via a single-mode fiber 102 to a polarization controller 103, in turn connected to a device under test via an input fiber 104. In FIG. 1, the device under test comprises a slab waveguide 105 with a diffractive element set 108 and input and output channel waveguides 106 and 107, respectively. Diffractive element set 108 redirects a portion of an optical signal emerging from input optical port 106 to output optical port 107 with a corresponding spectral transfer function. The input fiber 104 and the output fiber 109 are coupled to the ends of the respective channel waveguides using mechanical positioners 110. The output fiber is coupled to the detector 111. In FIG. 2, the device under test comprises a channel waveguide 203 with a diffractive element set 202. Diffractive element set 202 back-reflects a portion of an optical signal entering the channel waveguide 203 with a corresponding spectral transfer function. In this case, a fiber-optic circulator 204 is inserted into the input fiber 104 to separate the input and output optical signals. The portion of fiber 104 from the circulator 204 is coupled to the channel waveguide 203 using mechanical positioner 110. The output fiber 205 from the circulator 204 is coupled to the detector 111. TE and TM polarization states are calibrated using a metallic thin film near-infrared polarizer analyzer 301 (FIGS. 3 and 4) located between the output end of the input fiber and the detector 111. The polarizer was rotated to reject TE or TM polarization, the polarization controller was adjusted to minimize the reading of the detector and the controller setting needed to produce TE and TM polarization were recorded and used for subsequent measurements. All spectra presented herein are intended to illustrate polarization-dependent behavior, which is proportional to the birefringence. Without loss of generality, the maximum signal level for each measured spectrum is normalized to 0 dB to facilitate comparison.

To illustrate exemplary embodiments of planar optical waveguides with varying levels of birefringence, four different sample wafers were prepared, and various slab and channel waveguides with diffractive element sets were formed on each. Measurements were performed using the apparatus of FIGS. 1 and 2 to quantify the polarization-dependent wavelength shift (PDWL) as a measure of the birefringence, or to measure polarization-dependent optical power spectra of the output signals. It should be noted that the structures disclosed for each wafer and for any waveguides or diffractive elements formed thereon are exemplary only, and myriad other structures, materials, or arrangements may be employed within the scope of the present disclosure or appended claims.

The first wafer (Wafer A; illustrated schematically in FIGS. 5A-5D and 16A-16D) comprises a silicon substrate 502 about 725 μm thick ($h_S \approx 725$ μm), silicon oxide lower cladding 503 about 14 μm thick ($h_{LC} \approx 14$ μm; $n_{LC} \approx 1.446$; typically thermal oxide), a doped silicon oxide core 501 about 2 μm thick ($h_C \approx 2$ μm; $n_C \approx 1.457$), and a doped silicon oxide upper cladding 505 about 14 μm thick ($h_C \approx 14$ μm; $n_{UC} \approx 1.446$). The core and upper cladding may typically comprise deposited layers, with suitable dopant(s) for achieving the desired refractive indices. Suitable dopants may include but are not limited to boron, phosphorus, germanium, titanium, tantalum, aluminum, antimony, and others known in the art (see for example U.S. Pat. No. 6,501,896, said patent being hereby incorporated by reference as if fully set forth herein). The refractive indices are given for a design wavelength of about 1.5 μm. Another wafer (Wafer D; also illustrated schematically in FIGS. 5A-5D and 16A-16D) differs from Wafer A only in that the core thickness is about 4 μm ($h_C \approx 4$ μm). Other materials, thicknesses, or indices may be employed for forming the planar waveguide while remaining within the scope of the present disclosure or appended claims.

Diffractive elements 504 implemented on Wafers A and D comprise trenches formed by any suitable process at the interface between the core 501 and the upper cladding 505, the trenches being filled with upper cladding material. The spatial period of the diffractive elements 504 as illustrated in FIGS. 5A-5D and 16A-16D is about 0.53 μm ($\Lambda \approx 0.53$ μm), yielding design wavelengths around 1.5 μm. The trenches are about 0.25 μm wide ($a \approx 0.25$ μm) and are etched or otherwise formed to a depth of about 0.45 μm ($h_{etch} \approx 0.45$ μm). Other spatial periods, trench depths, trench widths, diffractive element location, or diffractive element morphology may be employed while remaining within the scope of the present disclosure or appended claims.

Another wafer (Wafer B; illustrated schematically in FIGS. 6A-6D and 17A-17D) comprises a silicon substrate 502 about 725 μm thick ($h_S \approx 725$ μm), silicon oxide lower cladding 503 about 14 μm thick ($h_{LC} \approx 14$ μm; $n_{LC} \approx 1.446$; typically thermal oxide), doped silicon oxide core layer 601 about 1 μm thick (referred to as the "grating layer"; $h_{GL} \approx 1$ μm; $n_{GL} \approx 1.49$), another doped silicon oxide core layer 602 about 1.6 μm thick (referred to as the "core fill layer"; $h_{CF} \approx 1.6$ μm; $n_{CF} \approx 1.46$), and a doped silicon oxide upper cladding 505 about 14 μm thick ($h_C \approx 14$ μm; $n_{UC} \approx 1.446$). It should be noted that the core fill layer is about 2 μm thick over areas of the planar waveguide lacking diffractive elements. The core layers and upper cladding may typically comprise deposited layers, with suitable dopant(s) for achieving the desired refractive indices (as disclosed hereinabove). The refractive indices are given for a design wavelength of about 1.5 μm.

Diffractive elements 603 implemented on Wafer B comprise trenches formed by any suitable process at the interface between the grating layer 601 and the core fill layer 602, the trenches being filled with core fill material. The spatial period of the diffractive elements 603 is about 0.53 μm ($\Lambda \approx 0.53$ μm), yielding design wavelengths around 1.5 μm. The trenches are about 0.25 μm wide ($a \approx 0.25$ μm) and are etched or otherwise formed to a depth of about 0.85 μm ($h_{etch} \approx 0.85$ μm). Other spatial periods, trench depths, trench widths, diffractive element location, or diffractive element morphology may be employed while remaining within the scope of the present disclosure or appended claims. Another wafer (Wafer C; also illustrated schematically in FIGS. 7A-7D and 18A-18D) differs from Wafer B only in that the grating layer thickness is about 0.75 μm ($h_{GL} \approx 0.75$ μm), so that the etched trenches extend all the way through the grating layer 601 and into the lower cladding layer 503. Other materials, thicknesses, or indices may be employed for forming the planar waveguide while remaining within the scope of the present disclosure or appended claims.

For slab waveguides formed on any of Wafers A, B, C, or D, the diffractive element contours are a series of concentric arcs separated by the spatial period Λ (FIGS. 5A-5D, 6A-6D, and 7A-7D). Input and output optical ports are located symmetrically with respect to the common center of the arcs. The overall length of each of the diffractive element sets in the slab waveguides is several millimeters. The input and output optical ports were coupled to the input optical fiber 104 and the output optical fiber 109 of the test setup shown in FIG. 1 by channel waveguides having cores about 6 μm wide. The various diffractive element sets were designed to reflect (equivalently, diffract) the input optical signal nearly backward at various corresponding wavelengths with various corresponding bandwidths.

For channel waveguides formed on any of Wafers A, B, C, or D, the channel waveguides formed are about 6 μm wide (FIGS. 16A-16D, 17A-17D, and 18A-18D). The overall length of each of the diffractive element sets in the channel waveguides is several millimeters. The channel waveguides were coupled to the optical fiber 104 of the test setup shown in FIG. 2. The various diffractive element sets were designed to back-reflect (equivalently, back-diffract) the input optical signals at various corresponding wavelengths with various corresponding bandwidths.

Birefringence Control by Layer Thickness/Index, Diffractive Element Height, or Diffractive Element Areal Density The dimensions given above result in an areal density of diffractive elements (equivalently, areal density of etched area) of about 0.5. In other words, about 50% of the area of the waveguide encompassed by the diffractive element set is etched and occupied by lithographically-formed diffractive elements. Note that various analogous definitions of the diffractive element areal density may be made for diffractive elements formed in various ways, e.g.: the areal density could defined as the fraction of the area not etched while lithographically forming the diffractive elements (in contrast to the definition employed herein); for a stamped diffractive element set, the diffractive element areal density could be based on the fraction of area compressed relative to adjacent areas; for elements formed by UV exposure, the areal density could be defined based on the fraction of the area exposed to form the diffractive elements. As long as a consistent definition of diffractive element areal density is employed, the empirically observed dependence of birefringence on areal density disclosed herein may be calibrated and employed for achieving a desired level of birefringence for a waveguide.

Figure 8:
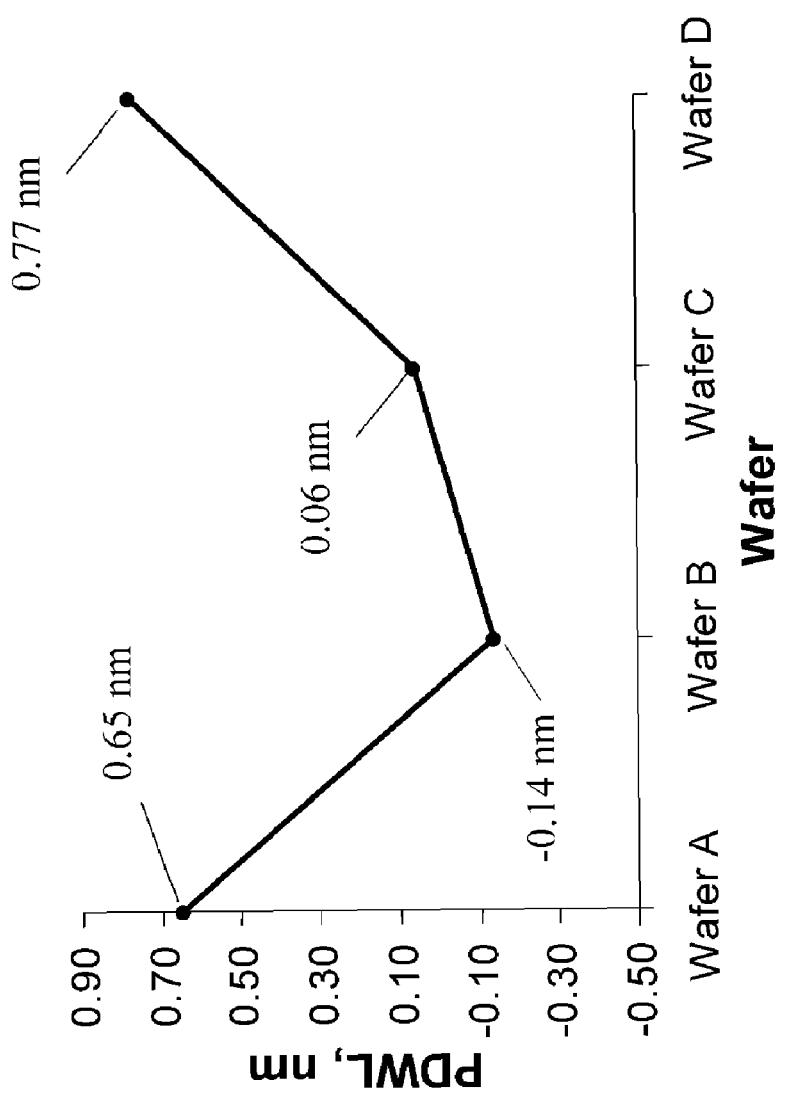
FIG. 8 is a plot of polarization-dependent wavelength shift (PDWL) for various slab waveguides.

The polarization-dependent wavelength shift for slab waveguides with diffractive elements formed on each of the sample wafers according to the dimensions given above are shown in the plot of FIG. 8. As can be seen from the plot, the birefringence (measured here as PDWL) varies significantly among the four wafer morphologies. Further modifications to the structure of the diffractive element sets (e.g., etch depth) or waveguide (thickness and composition of layers) will bring about further changes in birefringence, enabling a desired level of birefringence to be achieved in a particular waveguide. Parameters of the exemplary wafers that might be adjusted to achieve a desired level of birefringence might include, but are not limited to: $n_{LC}$, $n_{UC}$, $n_C$, $h_C$, $n_{GL}$, $h_{GL}$, $n_{CF}$, $h_{CF}$, and $h_{etch}$. The exemplary wafers might also be modified by inclusion of additional material layers for altering the birefringence. Each such added layer provides two more adjustable parameters (height and index) for enabling a particular desired level of birefringence to be achieved. It should be noted that the resulting dependencies of the birefringence on these parameters may or may not resemble those for the examples presented here, and such dependencies may or may not be monotonic. Suitable calibration of such dependencies may be performed, however, allowing a desired level of birefringence to be achieved based on a variety of parameters. Any suitable modifications of a waveguide structure for achieving a desired level of birefringence in a waveguide having diffractive elements shall fall within the scope of the present disclosure or appended claims.

The areal density of diffractive elements in the waveguide significantly affects the level of birefringence exhibited by the waveguide. As already noted, the areal density of diffractive elements in the exemplary embodiments of FIGS. 5A-5D, 6A-6D, and 7A-7D (slab) and FIGS. 16A-16D, 17A-D, and 18A-D (channel) is about 0.5. These diffractive element areal densities may be varied significantly, while maintaining the spectral transfer function of the diffractive element set, by employing the "grayscale" methods and structures disclosed in U.S. Pat. Nos. 6,678,429 and 6,829,417, listed and incorporated hereinabove.

Figure 9C:
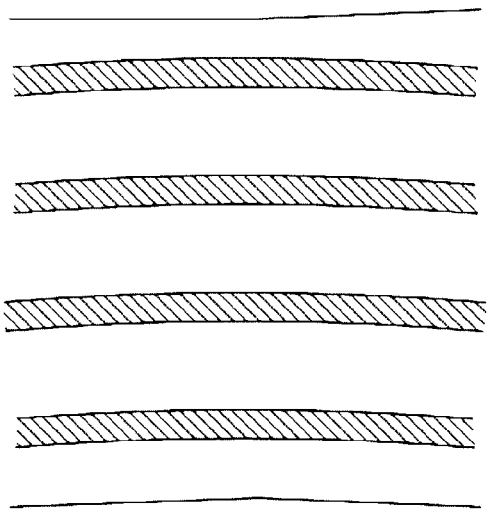
FIGS. 9C-9D are schematic top and side cross-sectional views of an exemplary slab waveguide with diffractive elements.
Figure 9D:
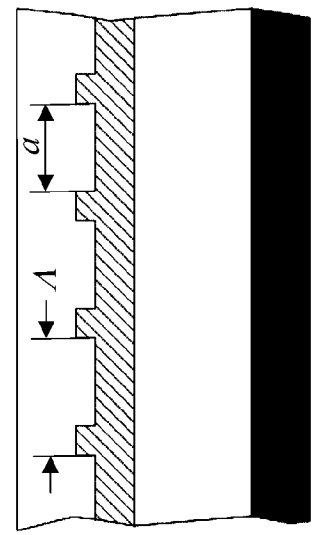
Figure 9A:
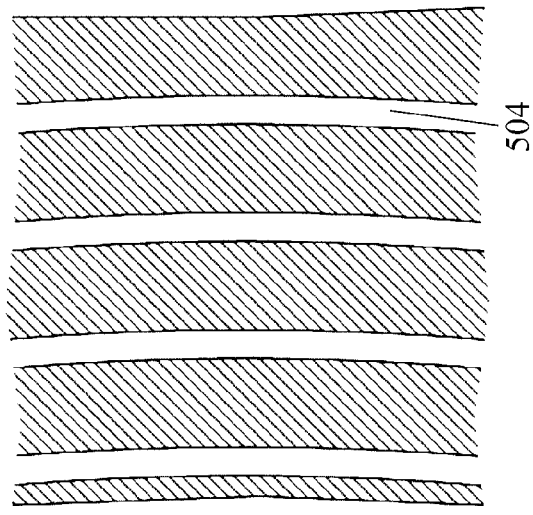
FIGS. 9A-9B are schematic top and side cross-sectional views of an exemplary slab waveguide with diffractive elements.
Figure 9B:
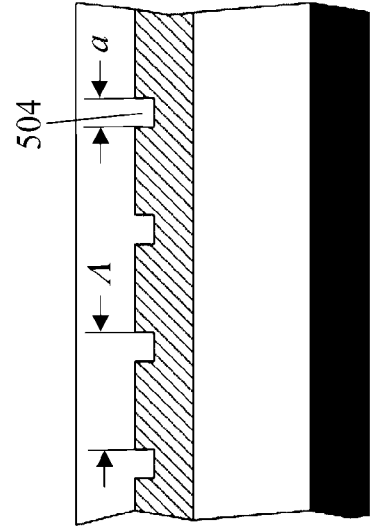

Line-density-grayscale implementations of the diffractive element set in a slab waveguide are illustrated schematically in FIGS. 9A-9D. In FIGS. 9A-9B, the line density of the diffractive elements is reduced while the width of each diffractive element trench is maintained, resulting in an areal density less than 0.5. In FIGS. 9C-9D, the line density of the diffractive elements is reduced, while the width of each diffractive element trench is increased so that the areal density of diffractive elements exceeds 0.5. In each case the optical pathlength between successive diffractive elements at the reduced line density may be set at an integer multiple of the original optical pathlength, so as to substantially preserve the main features of the spectral transfer function (albeit in a higher diffractive order). The altered width of diffractive elements in FIGS. 9C-9D may be set to an integer multiple of one quarter of the in-medium wavelength of the optical signal, so as to substantially maintain reflectivity of individual diffractive elements.

Figure 10C:
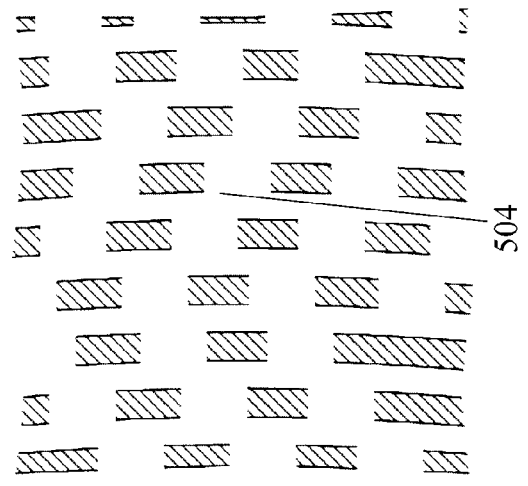
FIGS. 10C-10D are schematic top and side cross-sectional views of an exemplary slab waveguide with diffractive elements.
Figure 10D:
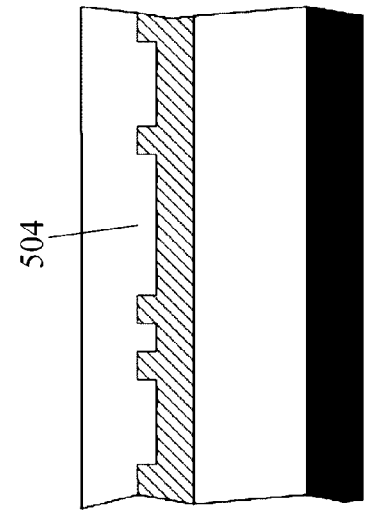
Figure 10A:
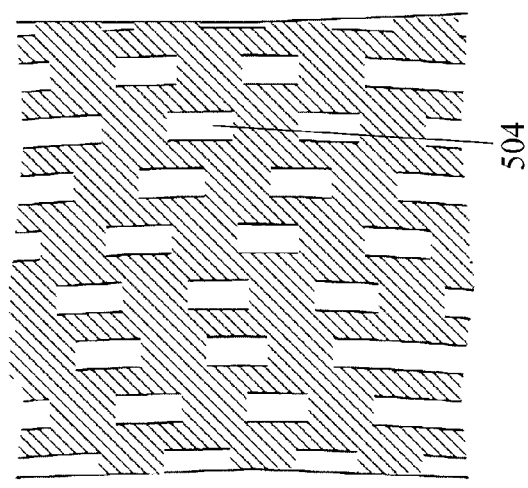
FIGS. 10A-10B are schematic top and side cross-sectional views of an exemplary slab waveguide with diffractive elements.
Figure 10B:
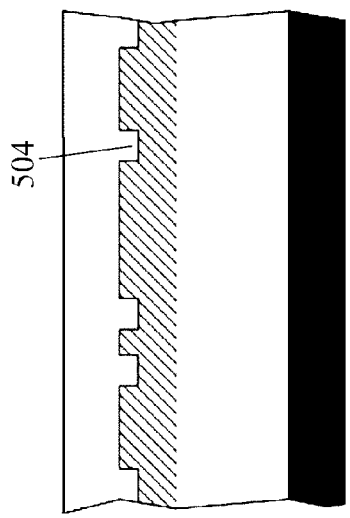

Partial-fill-grayscale implementations of the diffractive element set in a slab waveguide are illustrated schematically in FIGS. 10A-10D. In FIGS. 10A-10B, the areal density of diffractive elements is reduced below 0.5 by only partially etching each diffractive element trench. In FIGS. 10C-10D, areal density of diffractive elements is raised above 0.5 by employing an etch pattern complementary to the one used for FIGS. 10A-10B. In both cases the spectral transfer function may be substantially preserved.

Figure 11:
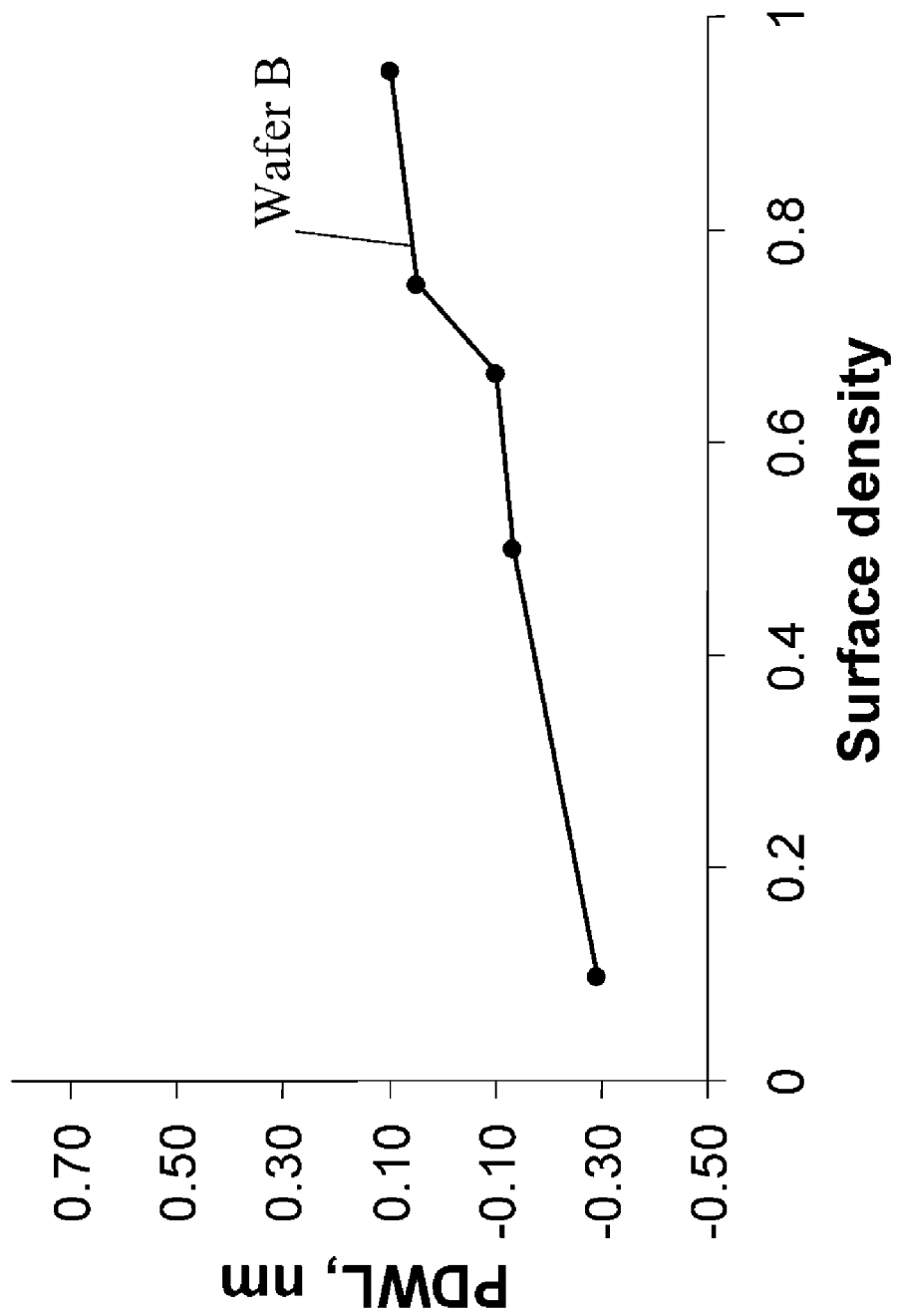
FIGS. 11 and 12 are plots of polarization-dependent wavelength shift (PDWL) for various slab waveguides.
Figure 12:
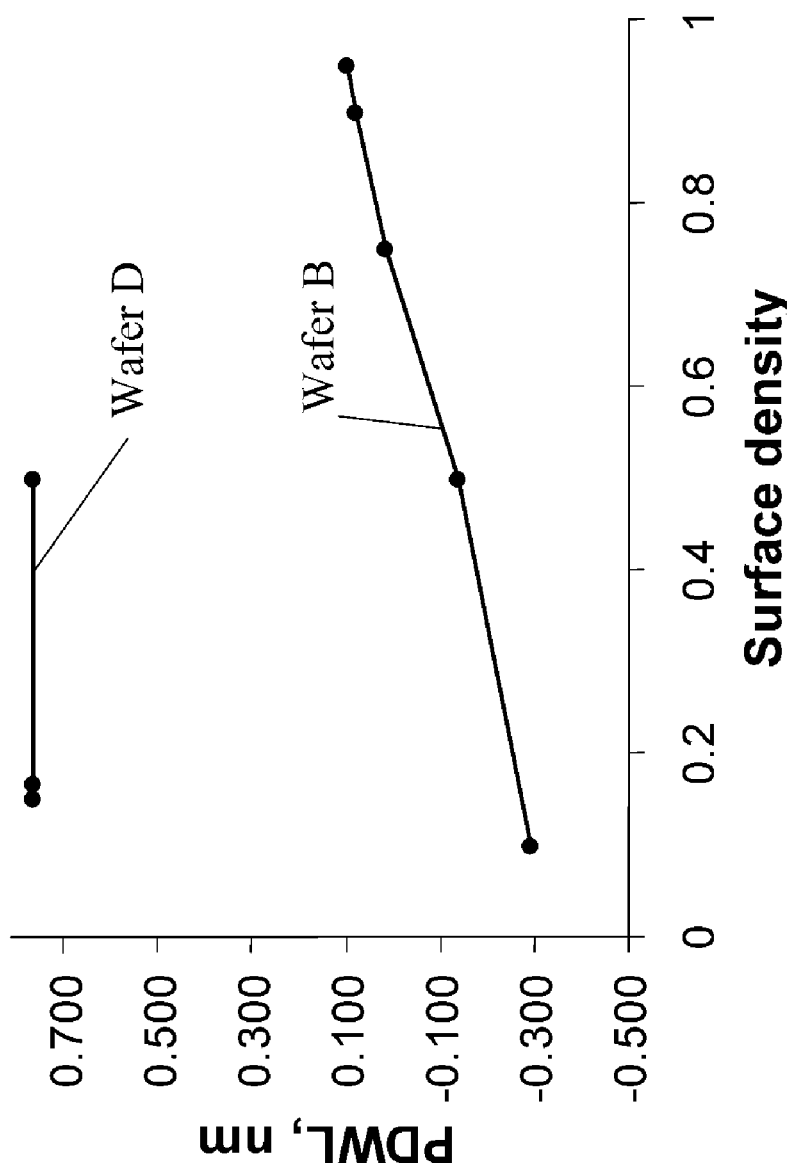
Figure 13:
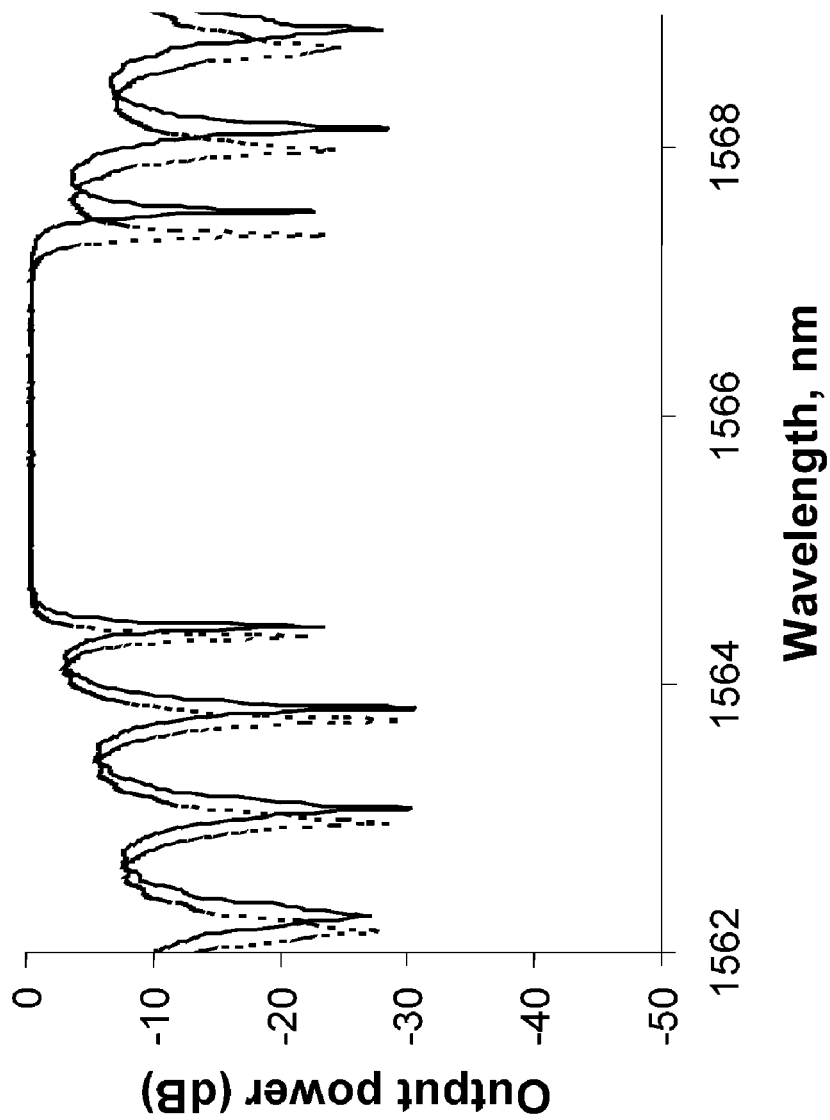
FIGS. 13, 14, and 15 are plots of spectral power transfer functions for TE and TM polarizations for various slab waveguides.
Figure 14:
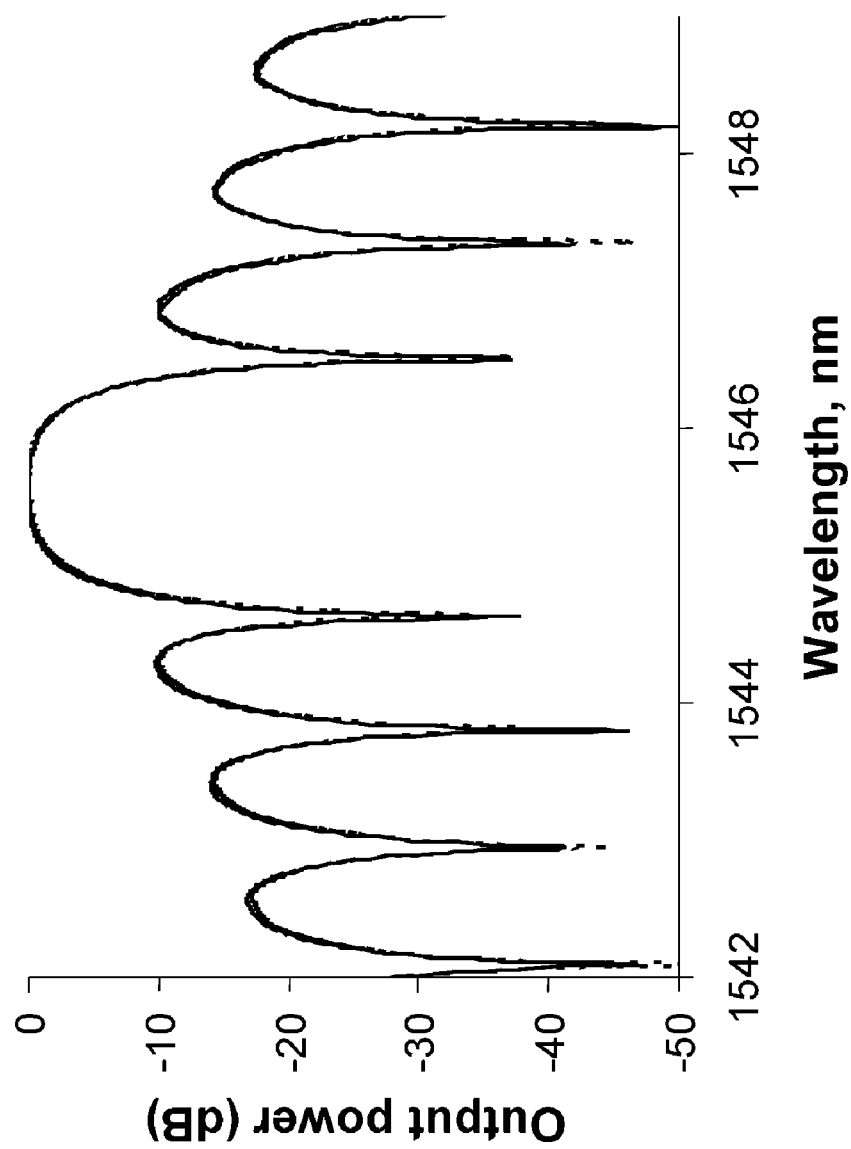
Figure 15:
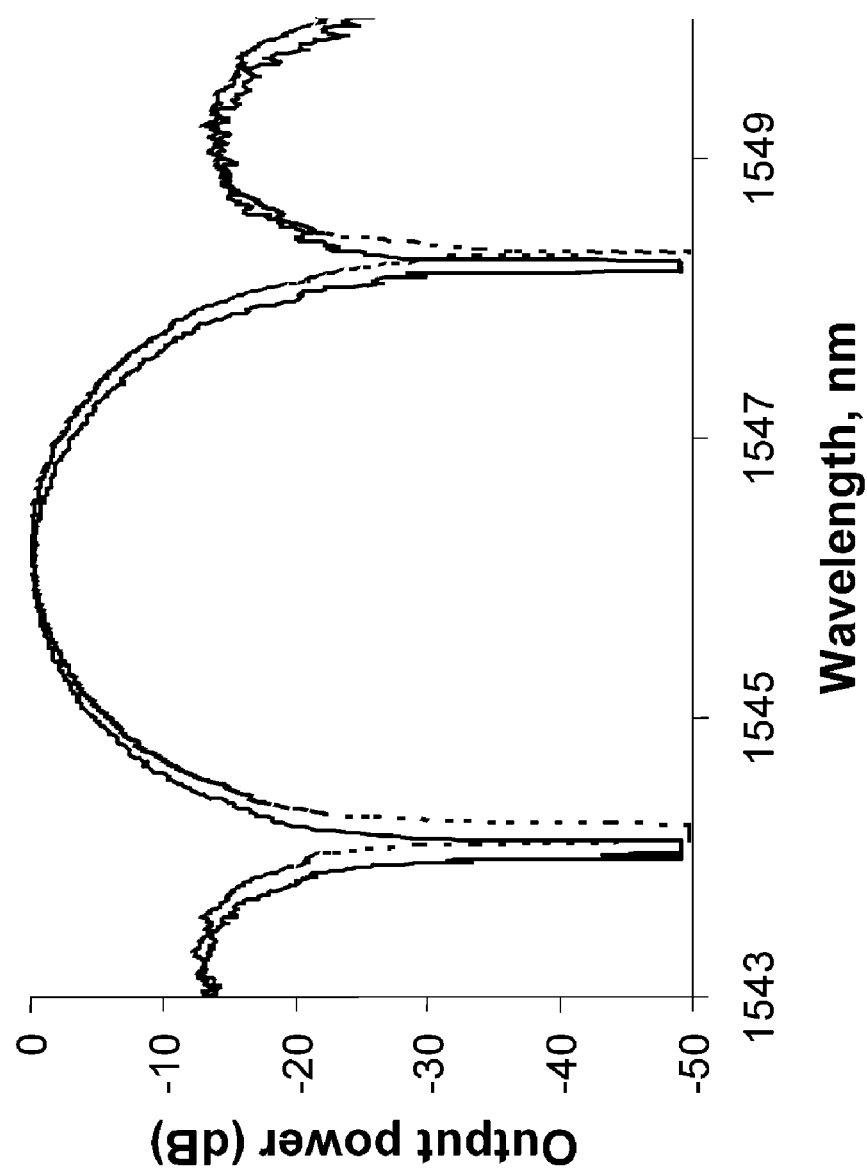
Figure 18A:
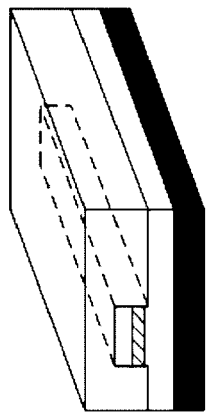
FIGS. 18A-18D are schematic top, side cross-sectional, end cross-sectional, and perspective views of an exemplary channel waveguide with diffractive elements.
Figure 18C:
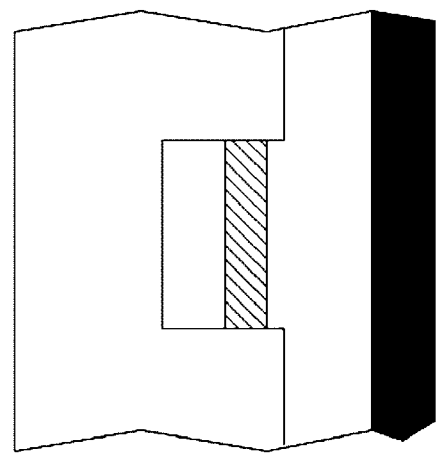
Figure 18B:
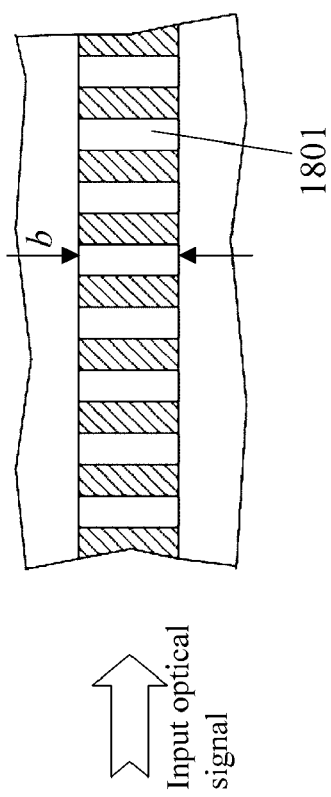
Figure 18D:
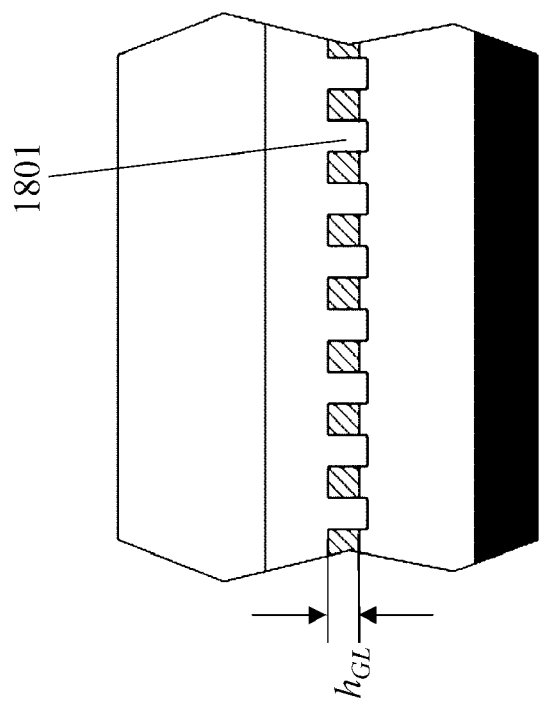

The effect of areal density of diffractive elements in slab waveguides is shown in the plots of FIGS. 11 and 12. FIG. 11 shows the PDWL versus areal density of diffractive elements for a slab waveguide fabricated on Wafer B, with the areal density varied as shown in FIG. 9A or 9C (line-density-grayscale). The lower plot of FIG. 12 shows the PDWL versus areal density for a slab waveguide fabricated on Wafer B, with the areal density varied as shown in FIG. 10A or 10C (partial-fill-grayscale). FIGS. 13-15 illustrate measured spectral power transfer functions and show polarization-dependent wavelength shifts. In each plot the spectrum for TE (TM) input polarization is shown as a solid (dashed) line. For both methods of varying the areal density of diffractive elements (line-density-grayscale and partial-fill-grayscale), the PDWL may be varied from about −0.3 nm to about 0.1 nm through variation in the areal density, with approximately the same dependency. It is possible that various fabrication processes may render the diffractive element sets of FIGS. 9A-9D with a degree of fidelity different from that of FIGS. 10A-10D, in which case the dependence of the birefringence on the nominal areal density should be calibrated.

The upper plot of FIG. 12 shows PDWL versus areal density for a diffractive element set in a slab waveguide formed on Wafer D. This illustrates that the specific dependence of the birefringence on areal density may be altered by altering the structure (i.e. depth) of the diffractive elements, as well as by altering the thickness or composition of layers comprising the core or containing the diffractive elements. In the specific example of Wafer D, the diffractive elements span only a small fraction of the thickness of the core layer, so alteration of the areal density has a correspondingly smaller effect on the birefringence. In Wafer B, wherein the diffractive elements span a substantial fraction of the thickness of the core, the effect of altering the areal density is correspondingly larger. In general, more strongly reflecting diffractive elements will typically exhibit a stronger dependence of PDWL versus areal density.

Figure 19A:
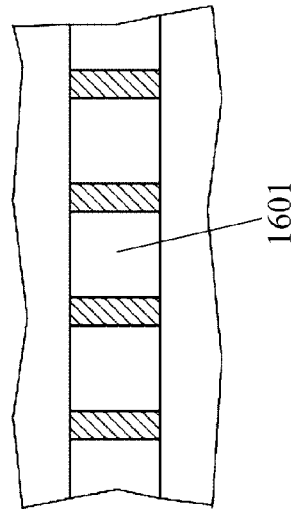
FIGS. 19A-19B are schematic top and side cross-sectional views of an exemplary channel waveguide with diffractive elements.
Figure 19B:
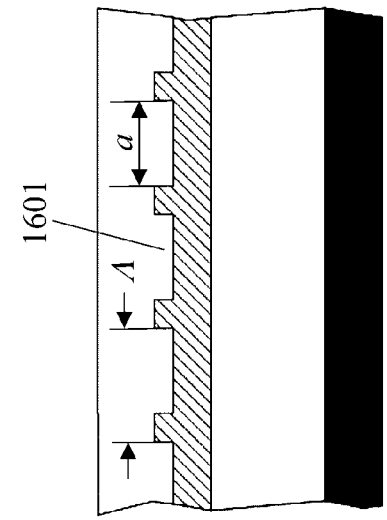
Figure 19C:
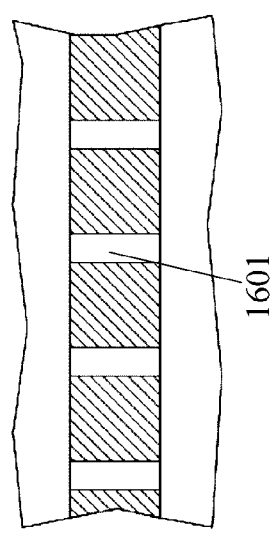
FIGS. 19C-19D are schematic top and side cross-sectional views of an exemplary channel waveguide with diffractive elements.
Figure 19D:
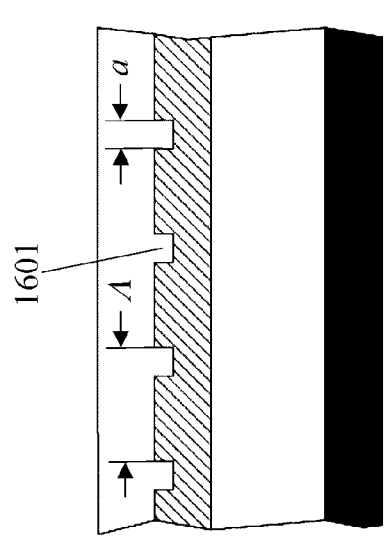

Line-density-grayscale implementations of the diffractive element set in a channel waveguide are illustrated schematically in FIGS. 19A-19D. In FIGS. 19A-19B, the line density of the diffractive elements is reduced while the width of each diffractive element trench is maintained, resulting in an areal density less than 0.5. In FIGS. 19C-19D, the line density of the diffractive elements is reduced, while the width of each diffractive element trench is increased so that the areal density of diffractive elements exceeds 0.5. In each case the optical pathlength between successive-diffractive elements at the reduced line density may be set at an integer multiple of the original optical pathlength, so as to substantially preserve the main features of the spectral transfer function (albeit in a higher diffractive order). The altered width of diffractive elements in FIGS. 19C-19D may be set to an integer multiple of one quarter of the in-medium wavelength of the optical signal, so as to substantially maintain reflectivity of individual diffractive elements.

Figure 20C:
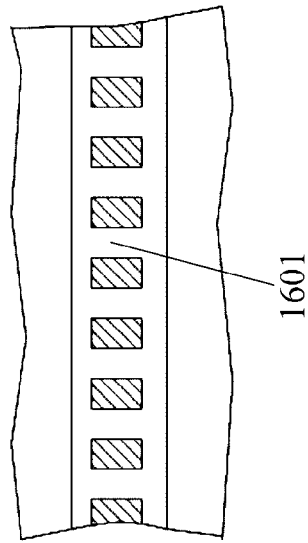
FIGS. 20C-20D are schematic top and side cross-sectional views of an exemplary channel waveguide with diffractive elements.
Figure 20D:
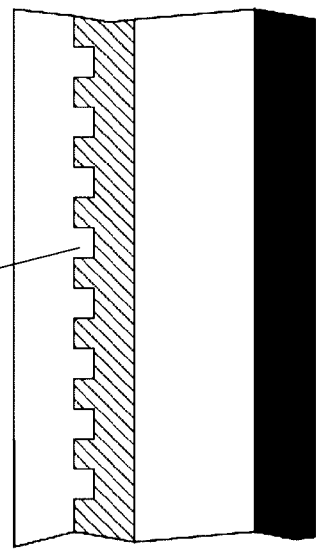
Figure 20A:
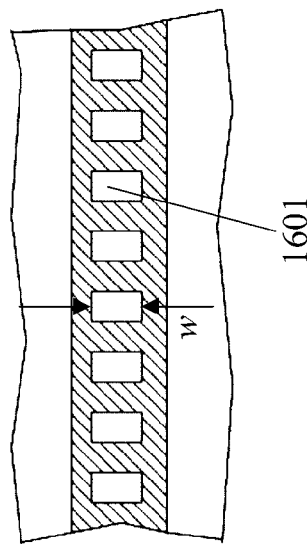
FIGS. 20A-20B are schematic top and side cross-sectional views of an exemplary channel waveguide with diffractive elements.
Figure 20B:
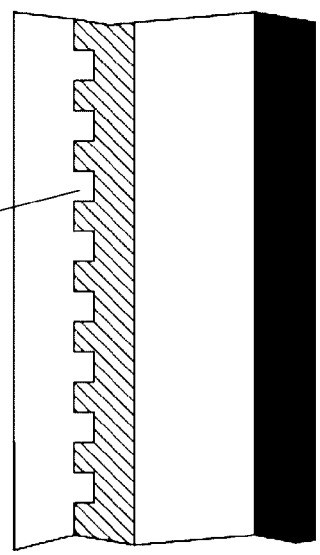

Partial-fill-grayscale implementations of the diffractive element set in a channel waveguide are illustrated schematically in FIGS. 20A-20D. In FIGS. 20A-20B, the areal density of diffractive elements is reduced below 0.5 by only partially etching each diffractive element trench. In FIGS. 20C-20D, areal density of diffractive elements is raised above 0.5 by employing an etch pattern complementary to the one used for FIGS. 310A-10B. In both cases the spectral transfer function may be substantially preserved.

Figure 21:
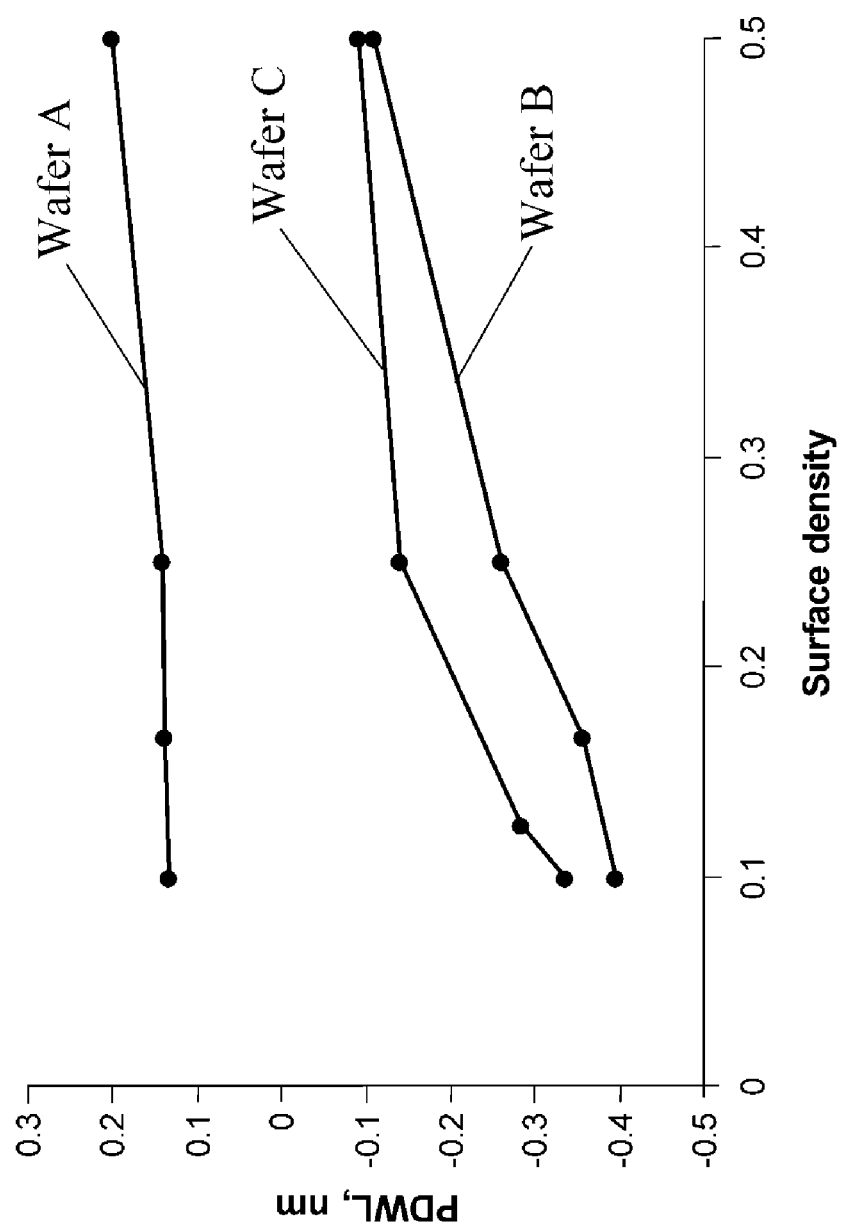
FIGS. 21 and 22 are plots of polarization-dependent wavelength shift (PDWL) for various channel waveguides.
Figure 22:
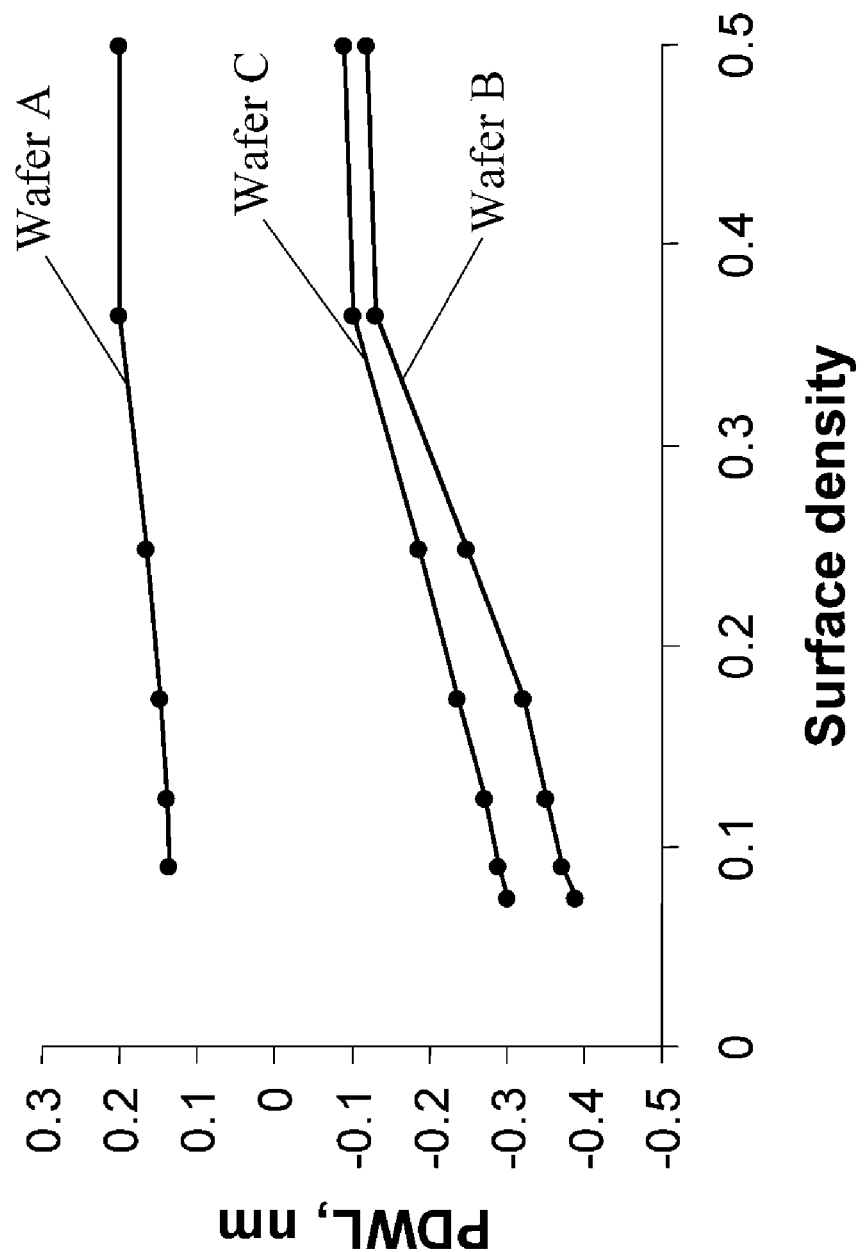
Figure 23:
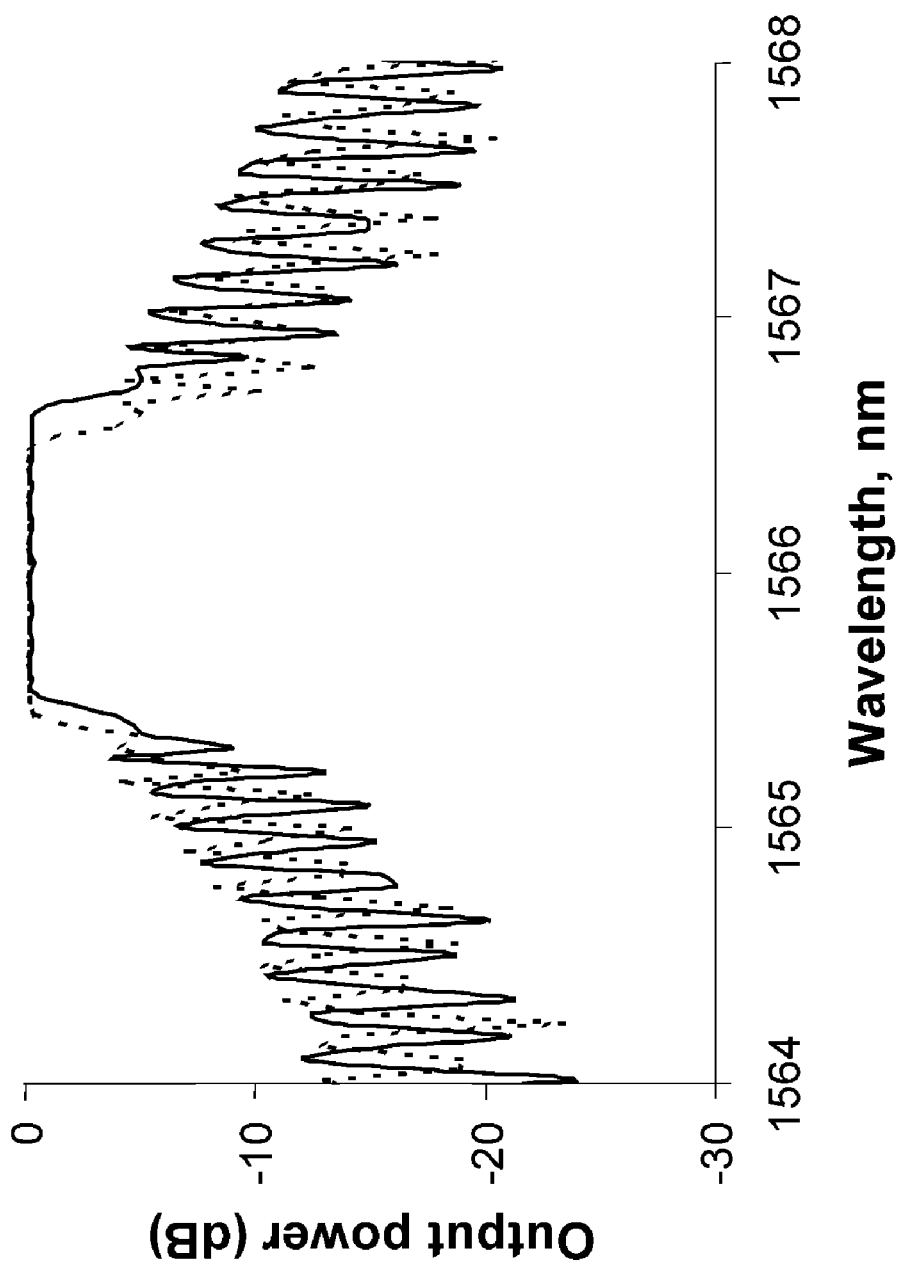
FIGS. 23, 24, and 25 are plots of spectral power transfer functions for TE and TM polarizations for various channel waveguides.
Figure 24:
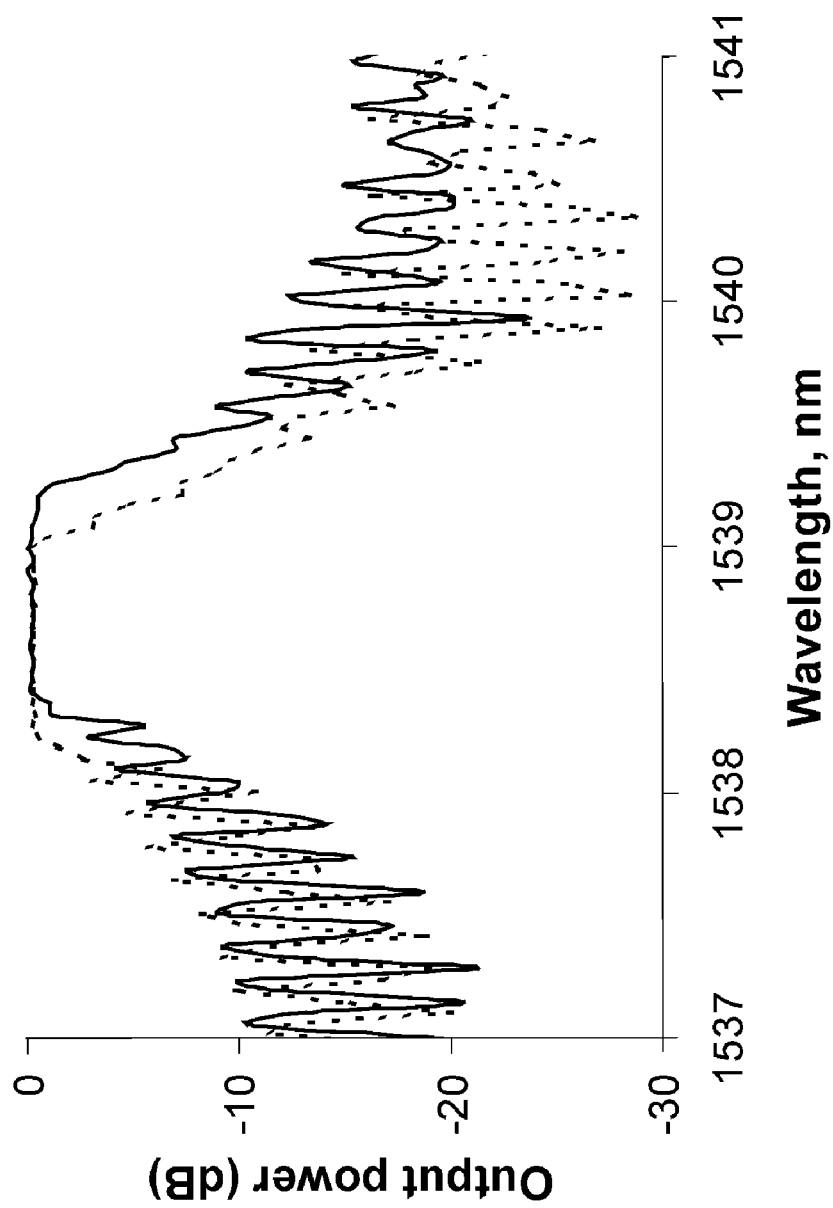
Figure 25:
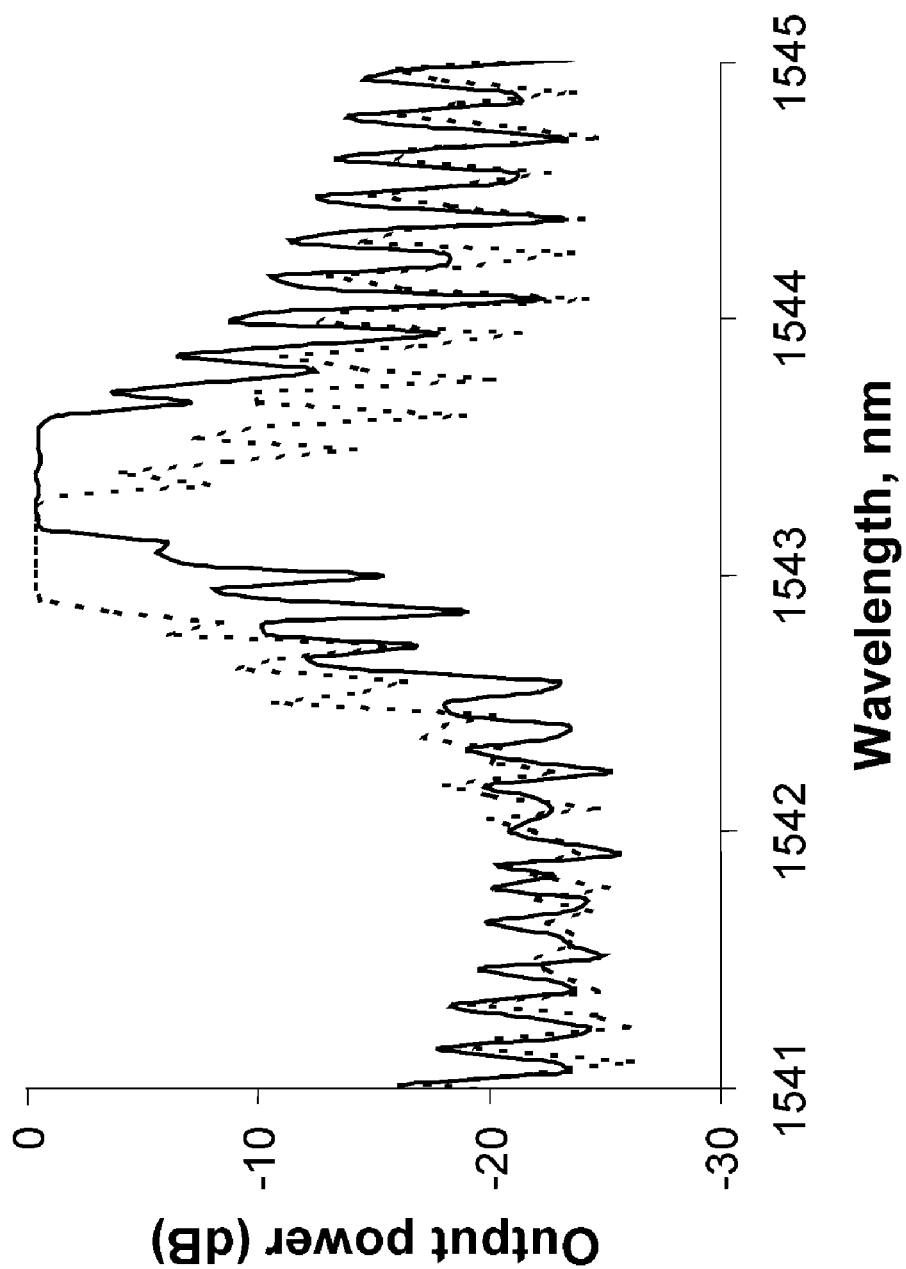

The effect of areal density of diffractive elements in channel waveguides is shown in the plots of FIGS. 21 and 22. FIG. 21 shows the PDWL versus areal density of diffractive elements for channel waveguides fabricated on Wafers A, B, and C with the areal density varied as shown in FIGS. 19A and 19C (line-density-grayscale). FIG. 22 shows the PDWL versus areal density of diffractive elements for channel waveguides fabricated on Wafers A, B, and C with the areal density varied as shown in FIGS. 20A and 20C (partial-fill-grayscale). FIGS. 23-25 illustrate measured spectral power transfer functions and show polarization-dependent wavelength shifts. In each plot the spectrum for TE (TM) input polarization is shown as a solid (dashed) line. It is readily observed that the birefringence and the specific dependence of PDWL on areal density of diffractive elements varies significantly with the etch depth (i.e., height of the diffractive elements) and with the thickness and composition of layers comprising the waveguide core. As observed hereinabove for slab waveguides, there may often be a stronger dependence of birefringence on areal density when the presence of diffractive elements cause a stronger perturbation of the optical properties of the waveguide (e.g., when etched diffractive elements extend deeper into the core).

It should be noted that the areal densities of diffractive elements indicated in the plots of FIGS. 11, 12, 21, and 22 are design values. The actual areal density of diffractive elements on the optical waveguide may deviate from the design value as a result of the specific fabrication processes used (e.g., due to lateral etch bias). However, as long as such deviations and wafer morphology are consistently repeatable, then a well-defined relationship may be established between the design areal density and the resulting birefringence of the fabricated device. It should also be noted that the areal density of diffractive elements is not the only determinant of birefringence in the waveguide. The overall birefringence may arise from a number of factors, including intrinsic material birefringence, form birefringence, and strain birefringence. It is assumed herein that waveguides formed on a given wafer type using a given fabrication process will exhibit a well-defined and reproducible variation of birefringence versus diffractive element areal density, so that it will generally be possible to calibrate the birefringence versus areal density for a given wafer type produced by a given fabrication process.

It is typically desirable to maintain a designed spectral transfer function achieved by amplitude or phase apodization of the diffractive element set while simultaneously altering the areal density of diffractive elements to achieve a desired level of birefringence (zero or non-zero). These design goals may be achieved through implementation, in slab or channel waveguides, of various methodologies disclosed in the references listed and incorporated hereinabove.

Simply changing the diffractive order of a diffractive element set allows alteration of the areal density of the diffractive elements while substantially maintaining the spectral transfer function. Examples of this have already been shown in FIGS. 9A-9D and 19A-19D, for example. By increasing the diffractive order (thus reducing the number density of diffractive elements), the areal density may be either decreased (as in FIGS. 9A-9B and 19A-19B) or increased (as in FIGS. 9C-9D and 19C-19D). For example, changing the diffractive order from 1 to 4 without changing the diffractive element width changes the areal density from about 0.5 to about 0.125.

Correlated-line-pair-grayscale is an exemplary methodology that may be employed to alter the areal density while substantially maintaining the spectral transfer function. For example, a design for a first-order diffractive element set may be divided into successive groups of three diffractive elements. One element of each group is omitted, while the other two are displaced from their original locations to substantially restore the overall reflectivity and relative phase of the group. In this way the design areal density would be changed from about 0.5 to about 0.33 while substantially maintaining the overall spectral transfer function.

Partial-fill-grayscale is another exemplary methodology that may be employed for altering the design areal density while substantially maintaining the spectral transfer function. The diffractive element set is first designed to achieve the desired spectral transfer function an to exhibit a designed areal density below the final desired areal density. A second diffractive element set is then designed to be overlaid on or interleaved with the first diffractive element set (e.g. diffractive element sets 5 and 6 shown in FIG. 31, 32, or 33). This may be achieved, for example, using one or more of the methodologies disclosed in application Ser. No. 10/998,185 listed and incorporated hereinabove. The second diffractive element set is designed with a spectral transfer function that is substantially zeroed over the intended operating wavelength range of the first diffractive element set (so as not to alter the designed spectral transfer function), and with an areal density such that the two diffractive element sets together yield the desired design areal density (and hence the desired level of birefringence in the fabricated device).

Other suitable grayscale methodologies or suitable overlay/interleave methodologies may be employed for achieving a desired spectral transfer function with a desired level of birefringence. Such suitable methodologies shall fall within the scope of the present disclosure or appended claims.

A commonly-occurring design goal may be to produce diffractive element sets in waveguides that exhibit little or no birefringence (i.e., PDWL substantially zeroed). It should be noted that diffractive element sets in channel waveguides about 6 μm wide formed on Wafer D exhibit a PDWL of only about 0.03 nm. Interestingly, diffractive element sets in slab waveguides on the same wafer yield PDWL up to 25 times larger. For slab waveguides with diffractive element sets, an etched areal density of about 0.75 on Wafer B yielded that smallest birefringence among the exemplary embodiments disclosed herein (PDWL of about 0.01 nm, substantially negligible under most circumstances).

Birefringence Control by Layer Thickness/Strain

The birefringence of slab or channel waveguides (with or without diffractive elements) may be controlled by exploiting strain birefringence arising from the various materials comprising the waveguide. As with the waveguide parameters disclosed hereinabove, the strain birefringence is typically only one contribution to the overall birefringence, and altering it by design may allow a desired overall level of waveguide birefringence to be achieved. In the following discussion, the thermal-expansion coefficient (TEC) may be defined as a material-specific proportionality factor relating a fraction change in linear dimension to a change in temperature. Similar, the stress-optical coefficient (SOC) may be defined as a material-specific proportionality factor relating an exhibited change in material birefringence and a fractional length change of the material between stressed and non-stressed conditions. SOC may also be referred to in the literature as a strain-optical coefficient, or may be alternatively defined in the literature based on force per unit area applied to a material.

Strain birefringence in planar optical waveguides typically arises through the following mechanism. Various layers of differing materials are successively formed or deposited on the typically much thicker waveguide substrate. At one or more points during the overall processing sequence, the substrate and layers are heated for annealing to congeal deposited layers, to foster diffusive smoothing of material interfaces, or for other purposes. However, since the thermal-expansion coefficients (TECs) of the substrate and layer materials typically differ, the layers will be strained once the waveguide is cooled to normal operating temperatures. The strain on each layer is compressive (i.e. the layer is squeezed laterally) if its TEC is smaller than that of the substrate, or tensile (i.e. the layer is stretched laterally) if its TEC is larger than that of the substrate. The strain is anisotropic, being directed mainly parallel to the substrate. Assuming the layer materials have non-zero stress-optical coefficients (SOCs), birefringence arises in each of the strained layers. Previous efforts directed toward controlling strain birefringence have been focused on the use of materials having matched TECs, thereby substantially eliminating the strain birefringence. The approach disclosed herein involves designing waveguide layer structures with materials having various TECs so that the resulting strain birefringence from the various layers balances out, along with other sources of waveguide birefringence, to a desired overall level of birefringence (zero or non-zero) for a propagating optical mode.

A simple illustration is shown in FIGS. 26A-26C. For simplicity, only strain substantially parallel to the substrate (i.e. lateral strain) will be considered; any bowing of the substrate will be neglected. In FIG. 26A, two waveguide layers 2601 and 2602 are deposited on substrate 2603, and all layers are at an elevated temperature for annealing. For convenience, all three layers are assumed to have the same length $l_{ini}$ at this stage; this need not be the case. The respective TECs for layers 2601, 2602 and 2603 are $a_1$, $a_2$, and $a_3$, so that upon cooling the lengths of the layers would change by an amount $\Delta l_i = a_i l_{ini} \Delta T$ if not bonded to one another (as in FIG. 26B). However, since the layers are bonded together, they all have the same final length $l_{fin}$ (as in FIG. 26C), and will therefore experience strain (differing compressive strain on layers 2601 and 2602 in this example, since both layers appear to have differing TECs that are each smaller than that of the substrate). In a similar example shown in FIGS. 26D-26F, layer 2601 is under tensile strain, since its TEC appears to be larger than that of the substrate 2603, while layer 2602 is under compressive strain, since its TEC appears to be smaller than that of the substrate. It should be understood that the foregoing model is only approximate. It should also be understood that the substrate is not necessary for controlling the strain birefringence, and that strain can arise from TEC-mismatch among the waveguide layers even if no substrate is present. In the present simple description, it is assumed that the substrate is dominant in determining $l_{fin}$ (since it is typically much thicker than the waveguide layers), but this need not be the case.

The sign and magnitude of the stress-optical coefficients for the waveguide layers materials determine the sign and magnitude of strain birefringence in each layer. The thicknesses and indices of the waveguide layers determines a spatial mode structure for a propagating optical mode. The overall strain birefringence experienced by a given mode is a weighted spatial average over the mode of the strain birefringence of the waveguide layers. Methods for calculating effective refractive indices in multi-layer planar optical waveguides with differing layer indices are well known in the art (see for example Chen et al, Optics Express Vol 7, No 8 pp 260-272, October 2000). In the examples of FIGS. 26A-26C, since both layers 2601 and 2602 are under compressive strain, it may be desirable that the materials comprising the layers have opposite signs of SOC to enable adjustment of the strain birefringence through zero by varying the relative thicknesses of the layers. In the examples of FIGS. 26D-26F, since layer 2601 is under tensile strain and layer 2602 is under compressive strain, it may be desirable that the materials comprising the layers have the same sign of SOC to enable adjustment of the strain birefringence through zero by varying the relative thicknesses of the layers. Depending on other sources of waveguide birefringence and the desired level of waveguide birefringence, it may be desirable for various layers of the waveguide to have strain birefringence of the same sign, or of opposite sign, and these may be achieved by selecting the relative TECs or by selecting the relative SOCs. More than two layers may be employed for manipulating strain birefringence in a planar optical waveguide, and each additional layer adds at least four parameters (index, TEC, SOC, thickness) that may be altered to achieve a desired level of waveguide birefringence. Addition of diffractive elements effectively adds another layer to the planar waveguide structure, with its index, TEC, and SOC averaged over the materials comprising the diffractive elements and portions of the waveguide therebetween. As with the areal density, exact analytical or numerical simulation is difficult, and empirical calibration of the birefringence resulting from a particular waveguide and diffractive element structure may be required.

The following embodiments are exemplary only, and should not be construed as limiting the scope of the present disclosure or appended claims. Myriad combinations of materials and structures may be employed wherein a desired level of birefringence is determined at least in part by selected thicknesses and selected stress-optical coefficients of materials comprising the planar optical waveguide, and selected non-negligible thermal expansion coefficient differentials among materials comprising the planar optical waveguide or comprising the waveguide substrate. All suitable structure and material combinations shall fall within the scope of the present disclosure or appended claims. Examples of arrangements that may be employed may include but are not limited to: arrangements wherein all waveguide layers are under compressive strain, all waveguide layers are under tensile strain, or some layers are under compressive strain while other layers are under tensile strain; arrangements wherein all waveguide layers exhibit birefringence of the same sign, or some waveguide layers exhibit birefringence of the sign opposite that of other waveguide layers; other arrangements not specifically set forth herein.

Figure 27:
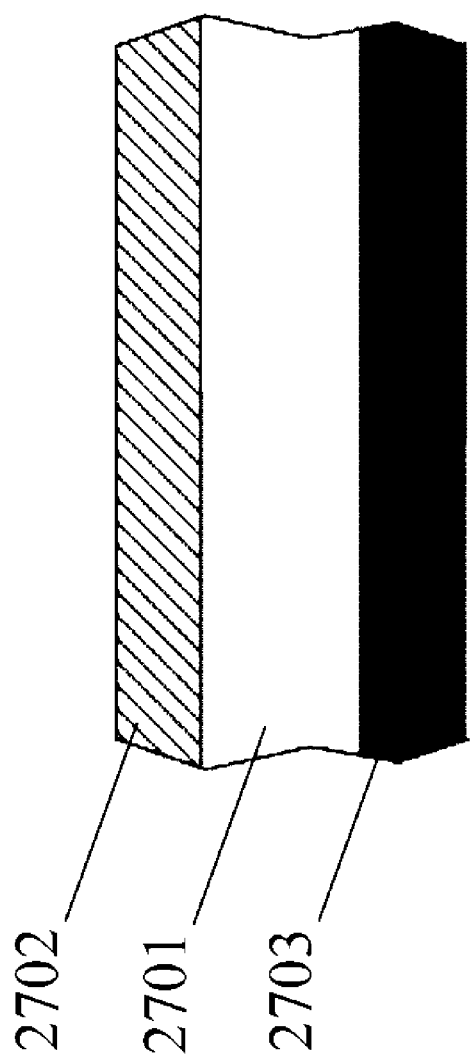
FIG. 27 is a schematic cross-section of an exemplary planar waveguide.

In the exemplary embodiment of FIG. 27, a slab optical waveguide is formed on a silicon substrate 2703 about 750 μm thick and comprises a silicon oxide lower cladding 2701 about 15 μm thick (n=1.446) and a doped silicon oxide core 2702 about 3 μm thick (n=1.457). The upper cladding comprises air or other inert gas, or vacuum (n=1). Form birefringence of the waveguide disregarding strain birefringence is $B=4\times10^{-4}$. The TEC for silicon is about $39\times10^{-7}$/K, while that of pure silicon oxide is about $5.5\times10^{-7}$/K (Schreimer et al, IEEE J. Quantum Electronics, Vol 40 No 8 pp 1131-1139, August 2004), and that of doped silicon oxide may range from that of pure silicon oxide to greater than that of silicon, depending on the identity and concentrations of dopant(s) (U.S. Pat. No. 6,501,896, for example). If the TECs of both cladding and core are lower than that of the substrate, both layers will be under compressive strain after cooling from a high-temperature anneal. If both layers have SOCs of the same sign, then core and cladding strain birefringence will be of the same sign. Assuming for the sake of concreteness that the strain birefringence of the core and cladding are $-2\times10^{-4}$ and $6\times10^{-4}$, respectively, then the net birefringence for the planar waveguide would be substantially zero (less than $6\times10^{-5}$) when the net effect of form and strain birefringence are accounted for. Note that non-zero TEC-mismatch-induced strain birefringence is used to compensate for form birefringence to achieve a substantially non-birefringent waveguide. Note also that the net birefringence is not merely an algebraic sum of the form and strain contributions, but should be averaged over the relevant spatial mode for accurate calculation of the birefringence.

Figure 28:
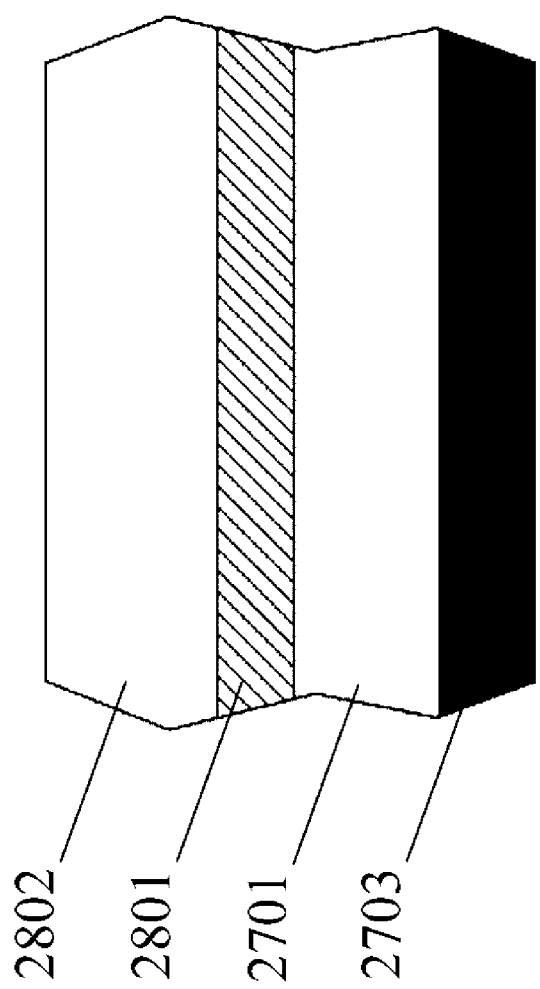
FIG. 28 is a schematic cross-section of an exemplary planar waveguide.

In the exemplary embodiment of FIG. 28, a slab waveguide is formed on a silicon substrate 2703 about 750 μm thick and comprises a silicon oxide lower cladding 2701 about 15 μm thick (n=1.446), a doped silicon oxide core 2801 about 2 μm thick (n=1.457), and a doped silicon upper cladding 2802 about 15 μm thick (n=1.446). Form birefringence for this waveguide (neglecting any strain birefringence) is about $5\times10^{-5}$. The lower cladding has a TEC smaller than that of the substrate, and the upper cladding may be doped to achieve the desired index and to have a desired TEC lower than that of the substrate (for example, using lower dopant concentrations than those disclosed for TEC-matching by Suzuki et al, Electronics Letters, Vol 33 No 13, 1997). The core is doped to have the desired index and to have a TEC higher than that of the substrate, using dopants such as germanium or phosphorus that increase both refractive index and TEC. (It should be noted that any suitable dopant may be employed, in layer 2801 or any other layer, including any of those disclosed in U.S. Pat. No. 6,501,896, and including those that raise or lower TEC, or raise or lower the index, in any combination). Upon cooling from a high temperature anneal, the upper and lower claddings will be under compressive strain, while the core will be under tensile strain. The core and claddings all have SOCs of the same sign, so the strain birefringence of the core will have the sign opposite that of the claddings. Assuming for concreteness that the resulting strain birefringence for the lower cladding, core, and upper cladding are $-6\times10^{-4}$, $3\times10^{-4}$, and $-2\times10^{-4}$, respectively, then the net waveguide birefringence is substantially zero. It should be noted that in the absence of form birefringence, layers having opposite signs for the strain birefringence are needed if substantially zero net birefringence is desired. Again, note that the net birefringence is not an algebraic sum of the birefringence of each of the layers, but should be spatially averaged over the propagating optical mode for an accurate calculation of the waveguide birefringence.

Figure 29:
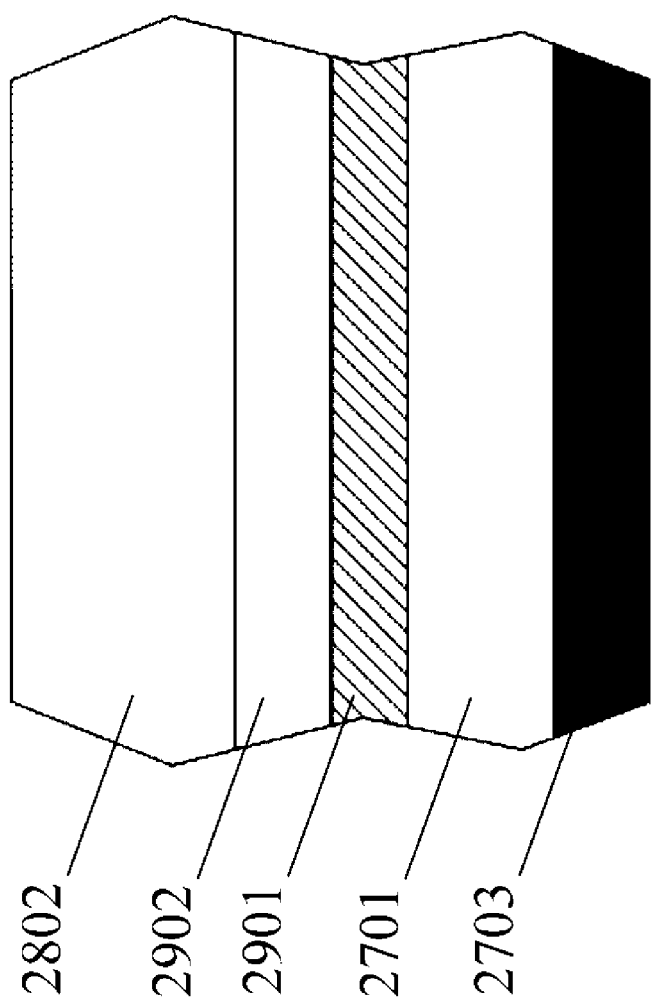
FIG. 29 is a schematic cross-section of an exemplary planar waveguide.

In the exemplary embodiment of FIG. 29, a slab waveguide is formed on a silicon substrate 2703 about 750 μm thick and comprises a silicon oxide lower cladding 2701 about 15 μm thick (n=1.446), a first doped silicon oxide core layer 2901 about 0.8 μm thick (n=1.475), a second doped silicon oxide core layer 2902 about 1.6 μm thick (n=1.46), and a doped silicon upper cladding 2802 about 15 μm thick (n=1.446). Form birefringence for this waveguide (neglecting any strain birefringence) is about $2\times10^{-4}$. The lower cladding 2701 has a TEC smaller than that of the substrate, and the upper cladding 2802 and the second core layer 2902 may be doped to achieve the desired index and to have a desired TEC lower than that of the substrate. The first core layer 2901 is doped to have the desired index and to have a TEC higher than that of the substrate. Upon cooling from a high temperature anneal, the upper and lower claddings and the second core layer will be under compressive strain, while the first core layer will be under tensile strain. Assuming for concreteness that the resulting strain birefringence for the lower cladding, first core layer, second core layer, and upper cladding are $-6\times10^{-4}$, $3\times10^{-4}$, $-3\times10^{-4}$, and $-2\times10^{-4}$, respectively, then the net waveguide birefringence is substantially zero.

Figure 30:
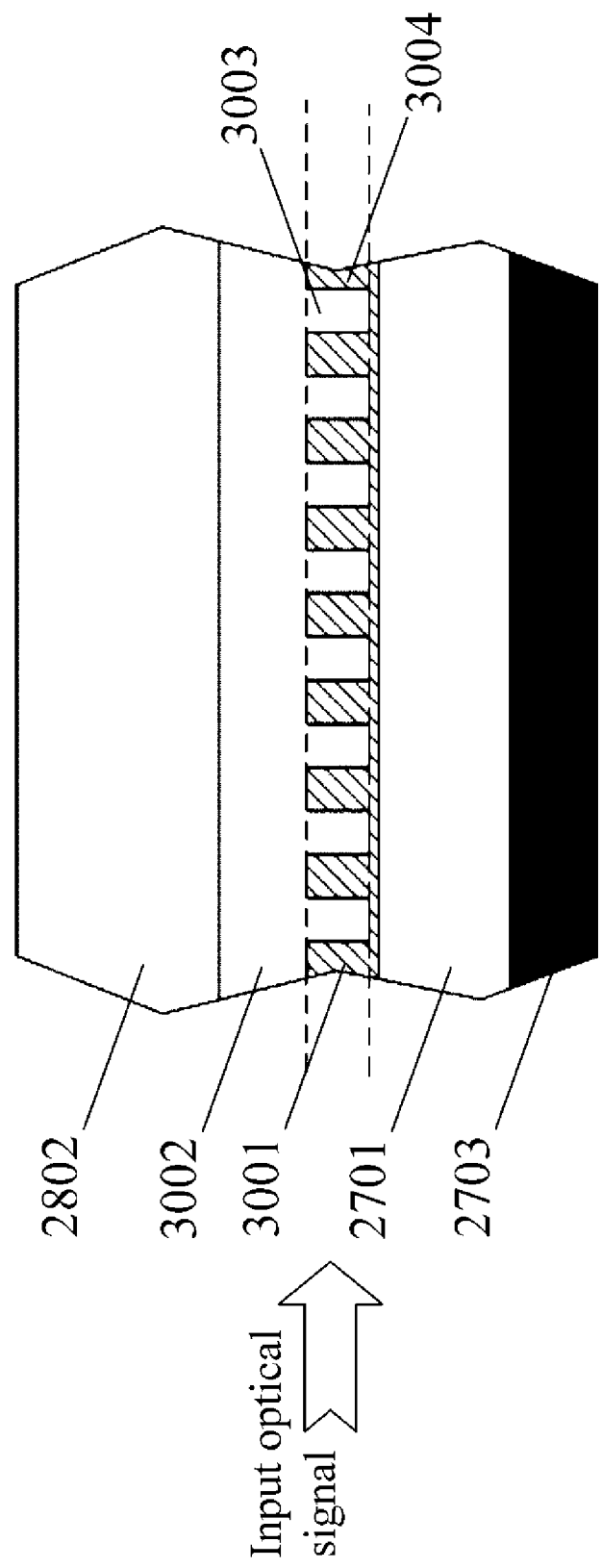
FIG. 30 is a schematic cross-section of an exemplary planar waveguide with diffractive elements.

In the exemplary embodiment of FIG. 30, a slab waveguide is formed on a silicon substrate 2703 about 750 μm thick and comprises a silicon oxide lower cladding 2701 about 15 μm thick (n=1.446), a first doped silicon oxide core layer 3001 about 1 μm thick (n=1.49), a second doped silicon oxide core layer 3002 about 1.6 μm thick (n=1.46), and a doped silicon upper cladding 2802 about 15 μm thick (n=1.446). Diffractive elements are formed by trenches etched about 0.8 μm deep into core layer 3001 with a duty cycle (i.e. element width divided by element spacing) of about D=0.5, and filled with the material forming core layer 3002. To facilitate the analysis, the diffractive elements 3003 may be considered to form a separate layer 2004 about 0.8 μm thick with an index given by n=1.49D+1.46(1−D) =1.475. Form birefringence for this waveguide (neglecting any strain birefringence) is about $3\times10^{-4}$. The lower cladding 2701 has a TEC smaller than that of the substrate, and the upper cladding 2802 and the second core layer 3002 may be doped to achieve the desired index and to have a desired TEC lower than that of the substrate. The first core layer 3001 is doped to have the desired index and to have a TEC higher than that of the substrate. Upon cooling from a high temperature anneal, the upper and lower claddings and the second core layer will be under compressive strain, while the first core layer will be under tensile strain. Assuming for concreteness that the resulting strain birefringence for the lower cladding, first core layer, diffractive element layer, second core layer, and upper cladding are $-6\times10^{-4}$, $1\times10^{-4}$, $-1\times10^{-4}$, $-3\times10^{-4}$, and $-2\times10^{-4}$, respectively, then the net waveguide birefringence is substantially zero.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements may be reduced in some Figures for clarity. It should be further noted that the embodiments shown in the Figures are exemplary only, and should not be construed as specifically limiting the scope of the present disclosure or appended claims. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

What is claimed is:

1. An optical apparatus comprising a planar optical waveguide arranged so as to substantially confine in at least one transverse spatial dimension optical signals propagating therein, wherein:

the optical signals propagate in the planar optical waveguide in corresponding signal optical transverse modes substantially confined in at least one transverse dimension by the planar optical waveguide;

the planar optical waveguide comprises at least one cladding layer and a core, the core consisting of exactly two core layers; and the planar optical waveguide is arranged so as to exhibit a designed level of birefringence for a selected one of the signal optical transverse modes, said arrangement including selected refractive indices and selected relative material volumes of the two core layers that yield the designed level of birefringence.

2. The apparatus of claim 1 wherein said arrangement further includes selected thicknesses and selected stress-optical coefficients of materials comprising the two core layers, and at least one selected non-negligible thermal expansion coefficient differential among the materials comprising those layers or comprising a waveguide substrate thereof, that yield the designed level of birefringence.

3. The apparatus of claim 2 wherein:

the two core layers exhibit a selected non-negligible thermal expansion coefficient differential with each other, resulting in differing levels of strain-induced birefringence among them; and said arrangement includes selected thicknesses of the two core layers that yield the designed level of birefringence.

4. The apparatus of claim 2 further comprising a waveguide substrate on which the planar optical waveguide is formed, wherein:

each of the two core layers exhibits a corresponding selected thermal expansion coefficient differential with the waveguide substrate, resulting in differing levels of strain-induced birefringence among the two core layers; and said arrangement includes selected thicknesses of the two core layers that yield the designed level of birefringence.

5. The apparatus of claim 2 wherein:

the two core layers exhibit a selected non-negligible stress-optical coefficient differential with each other, resulting in differing levels of strain-induced birefringence among them; and said arrangement includes selected thicknesses of the two layers that yield the designed level of birefringence.

6. The apparatus of claim 2 further comprising a waveguide substrate on which the planar optical waveguide is formed, wherein:

one of the two core layers exhibits a selected thermal expansion coefficient greater than that of the waveguide substrate;

the other one of the two core layers exhibits a selected thermal expansion coefficient less than that of the waveguide substrate;

the two core layers exhibit corresponding selected stress-optical coefficients of the same sign;

resulting corresponding levels of strain-induced birefringence of the waveguide material layers exhibit opposite signs; and said arrangement includes selected thicknesses of the two core layers that yield the designed level of birefringence.

7. The apparatus of claim 2 wherein the designed level of birefringence is less than a level of birefringence exhibited by a planar optical waveguide comprising only one of the two core layers.

8. The apparatus of claim 2 wherein the designed level of birefringence is at or below an operationally acceptable level.

9. The apparatus of claim 2 wherein the planar optical waveguide comprises a channel waveguide substantially confining in two transverse dimensions optical signals propagating therein, the optical signals propagating in the channel waveguide in corresponding signal optical transverse modes substantially confined in the two transverse dimensions by the channel waveguide.

10. The apparatus of claim 2 wherein the planar optical waveguide comprises a slab waveguide substantially confining in one transverse dimensions optical signals propagating in two dimensions therein, the optical signals propagating in the slab waveguide in corresponding signal optical transverse modes substantially confined in the one transverse dimension by the slab waveguide.

11. The apparatus of claim 2 further comprising a waveguide substrate on which the planar optical waveguide is formed, wherein:
at least one of the two core layers comprises doped silica, silicon nitride, or silicon oxynitride;
the cladding layer comprises silica or doped silica; and
the waveguide substrate comprises silicon or doped silicon.

12. An optical apparatus comprising a planar optical waveguide arranged so as to substantially confine in at least one transverse spatial dimension optical signals propagating therein, wherein:
the optical signals propagate in the planar optical waveguide in corresponding signal optical transverse modes substantially confined in at least one transverse dimension by the planar optical waveguide;
the planar optical waveguide comprises at least one cladding layer, a first core layer, and a second core layer;
the planar optical waveguide is arranged so as to exhibit a designed level of birefringence for a selected one of the signal optical transverse modes, said arrangement including selected refractive indices and selected relative material volumes of the first and second core layers that yield the designed level of birefringence;
said arrangement further includes selected thicknesses and selected stress-optical coefficients of materials comprising the first and second core layers, and at least one selected non-negligible thermal expansion coefficient differential among the materials comprising those layers or comprising a waveguide substrate thereof, that yield the designed level of birefringence;
the planar optical waveguide further comprises at least one set of diffractive elements;
each diffractive element set routes, between corresponding input and output optical ports, a corresponding diffracted portion of an input optical signal propagating in the planar optical waveguide that is diffracted by the diffractive element set;
the input optical signal is successively incident on the diffractive elements; and
said arrangement further includes a selected areal density of diffractive elements that yields the designed level of birefringence.

13. The apparatus of claim 12 wherein said arrangement includes partial-fill-grayscale implementation of the diffractive element set.

14. The apparatus of claim 12 wherein said arrangement includes line-density-grayscale implementation of the diffractive element set.

15. The apparatus of claim 12 wherein said arrangement includes a second diffractive element set overlaid on or interleaved with the at least one diffractive element set to yield the areal density.

16. An optical apparatus comprising a planar optical waveguide arranged so as to substantially confine in at least one transverse spatial dimension optical signals propagating therein, wherein:
the optical signals propagate in the planar optical waveguide in corresponding signal optical transverse modes substantially confined in at least one transverse dimension by the planar optical waveguide;
the planar optical waveguide comprises at least one cladding layer, a first core layer, and a second core layer;
the planar optical waveguide is arranged so as to exhibit a designed level of birefringence for a selected one of the signal optical transverse modes, said arrangement including selected refractive indices and selected relative material volumes of the first and second core layers that yield the designed level of birefringence;
said arrangement further includes selected thicknesses and selected stress-optical coefficients of materials comprising the first and second core layers, and at least one selected non-negligible thermal expansion coefficient differential among the materials comprising those layers or comprising a waveguide substrate thereof, that yield the designed level of birefringence;
the planar optical waveguide further comprises at least one set of diffractive elements;
each diffractive element set routes between corresponding input and output optical ports, a corresponding diffracted portion of an input optical signal propagating in the planar optical waveguide that is diffracted by the diffractive element set; and
the input optical signal is successively incident on the diffractive elements; and
said arrangement further includes a selected diffractive element height and a selected diffractive element position along the confined transverse spatial dimension that yields the designed level of birefringence.

17. The apparatus of claim 16 wherein the diffractive elements of the set are formed at a boundary between the first and second core layers.

18. The apparatus of claim 17 wherein each diffractive element comprises a trench formed in the first core layer and substantially filled with material of the second core layer.

19. The apparatus of claim 16 wherein the diffractive elements of the set are formed at a boundary between one of the core layers and the cladding layer.

20. The apparatus of claim 19 wherein each diffractive element comprises a trench formed in one of the core layers and substantially filled with material of the cladding layer.

21. The apparatus of claim 16 wherein diffractive elements of the set are formed completely within the core layers.

22. The apparatus of claim 16 wherein the diffractive elements of the set extend through only a portion of the thickness of one of the core layers.

23. The apparatus of claim 16 wherein the diffractive elements of the set extend through the entire thickness of at least one of the core layers.

24. The apparatus of claim 2 further comprising a second cladding layer, wherein the two core layers are between the cladding layers.

25. The apparatus of claim 12 wherein the diffractive elements of the set are formed at a boundary between the first and second core layers.

26. The apparatus of claim 12 wherein the diffractive elements of the set are formed at a boundary between one of the core layers and the cladding layer.

27. The apparatus of claim 18 wherein said arrangement further includes a selected trench depth that yields the designed level of birefringence.

28. The apparatus of claim 18 wherein said arrangement further includes a selected trench width that yields the designed level of birefringence.

29. The apparatus of claim 20 wherein said arrangement further includes a selected trench depth that yields the designed level of birefringence.

30. The apparatus of claim 20 wherein said arrangement further includes a selected trench width that yields the designed level of birefringence.

* * * * *